(12) United States Patent
Blackwell et al.

(10) Patent No.: US 9,398,072 B2
(45) Date of Patent: Jul. 19, 2016

(54) VIRTUAL MEDIA SYSTEMS, METHODS AND DEVICES

(75) Inventors: Steven Blackwell, Huntsville, AL (US); Christopher L. Thomas, Madison, AL (US); Philip M. Kirshtein, New Market, AL (US); David H. Stafford, Huntsville, AL (US); James Vernon Pursel, Edmonds, WA (US); Paul D. Durden, Gurley, AL (US)

(73) Assignee: Avocent Corporation, Huntsville, AL (US)

( * ) Notice: Subject to any disclaimer, the term of this patent is extended or adjusted under 35 U.S.C. 154(b) by 0 days.

(21) Appl. No.: 12/618,565

(22) Filed: Nov. 13, 2009

(65) Prior Publication Data

US 2010/0057956 A1 Mar. 4, 2010

Related U.S. Application Data

(62) Division of application No. 11/410,084, filed on Apr. 25, 2006, now Pat. No. 7,640,382.

(60) Provisional application No. 60/675,842, filed on Apr. 29, 2005.

(51) Int. Cl.
*G06F 13/12* (2006.01)
*H04L 29/08* (2006.01)
*H04L 29/06* (2006.01)

(52) U.S. Cl.
CPC ............... *H04L 67/08* (2013.01); *G06F 13/12* (2013.01); *H04L 67/1097* (2013.01); *H04L 69/08* (2013.01)

(58) Field of Classification Search
None
See application file for complete search history.

(56) References Cited

U.S. PATENT DOCUMENTS

| 6,041,395 A | 3/2000 | Beelitz |
| 6,119,143 A | 9/2000 | Dias et al. |
| 6,119,146 A | 9/2000 | Heller et al. |

(Continued)

FOREIGN PATENT DOCUMENTS

| EP | 1469391 | 10/2004 |
| TW | 522329 | 3/2002 |

(Continued)

OTHER PUBLICATIONS

Anonymous, "KVM Plus," IP.com Journal, Aug. 27, 2003, whole document.

(Continued)

*Primary Examiner* — Farley Abad
*Assistant Examiner* — Dayton Lewis-Taylor
(74) *Attorney, Agent, or Firm* — Davidson Berquist Jackson & Gowdey LLP

(57) ABSTRACT

In a KVM system, a system provides for USB devices to be accessed by target computers. A KVM switch connects a client with a target server via a network, the client computer having at least one device attached thereto. A second mechanism connects to a USB port of the target and communicates with the target using a USB protocol. A client mechanism communicates with the second mechanism via the network. A virtual media mechanism enables the target server to access the USB device attached to the client.

11 Claims, 29 Drawing Sheets

(56) References Cited

U.S. PATENT DOCUMENTS

| | | | |
|---|---|---|---|
| 6,137,455 A | 10/2000 | Duo | |
| 6,173,306 B1 | 1/2001 | Raz et al. | |
| 6,345,323 B1 | 2/2002 | Beasley et al. | |
| 6,373,476 B1 | 4/2002 | Dalgleish et al. | |
| 6,388,658 B1 | 5/2002 | Ahern et al. | |
| 6,557,170 B1 | 4/2003 | Wilder et al. | |
| 6,578,140 B1 | 6/2003 | Policard | |
| 6,601,124 B1 | 7/2003 | Blair | |
| 6,609,034 B1 | 8/2003 | Behrens et al. | |
| 6,618,774 B1 | 9/2003 | Dickens et al. | |
| 6,633,934 B1 | 10/2003 | Thornton | |
| 6,636,929 B1 | 10/2003 | Frantz et al. | |
| 6,672,896 B1 | 1/2004 | Li | |
| 6,748,005 B1 | 6/2004 | Riazi et al. | |
| 6,886,055 B2 | 4/2005 | Heller et al. | |
| 6,947,287 B1 | 9/2005 | Zansky et al. | |
| 6,983,340 B1 | 1/2006 | Hermanson et al. | |
| 7,024,497 B1* | 4/2006 | Maffezoni | 710/36 |
| 7,043,748 B2 | 5/2006 | Thornton et al. | |
| 7,213,044 B2* | 5/2007 | Tjong et al. | 709/200 |
| 7,478,141 B2 | 1/2009 | Rothman et al. | |
| 2001/0044843 A1 | 11/2001 | Bates et al. | |
| 2002/0143996 A1 | 10/2002 | Odryna et al. | |
| 2003/0088655 A1 | 5/2003 | Leigh et al. | |
| 2003/0126323 A1 | 7/2003 | Ferguson et al. | |
| 2003/0184960 A1 | 10/2003 | Ferguson | |
| 2003/0200345 A1 | 10/2003 | Ramsey et al. | |
| 2003/0200473 A1 | 10/2003 | Fung | |
| 2004/0199639 A1* | 10/2004 | Harris | 709/227 |
| 2004/0221009 A1 | 11/2004 | Cook et al. | |
| 2004/0267926 A1 | 12/2004 | Rothman et al. | |
| 2005/0015501 A1* | 1/2005 | Kaplan et al. | 709/228 |
| 2005/0044186 A1 | 2/2005 | Petrisor | |
| 2005/0069034 A1 | 3/2005 | Dambrackas | |
| 2005/0105542 A1 | 5/2005 | Seki et al. | |
| 2005/0138245 A1 | 6/2005 | Chen | |
| 2005/0225935 A1 | 10/2005 | Chen | |
| 2005/0246433 A1 | 11/2005 | Carrigan et al. | |
| 2006/0122955 A1 | 6/2006 | Bethlehem et al. | |
| 2006/0206666 A1 | 9/2006 | Lambert et al. | |
| 2006/0242379 A1* | 10/2006 | Korgaonkar et al. | 711/170 |
| 2009/0077280 A1* | 3/2009 | Anderson et al. | 710/62 |

FOREIGN PATENT DOCUMENTS

| | | |
|---|---|---|
| TW | 591910 | 6/2004 |
| WO | WO 03/042844 | 5/2003 |

OTHER PUBLICATIONS

Bernstein, "Control Data Center Servers," Systems Management, pp. 99-101, Dell Copyright 2004 (October).
European Office Action dated May 8, 2009 in EP Appln. No. 06758646.1.
European Search Report mailed Jan. 23, 2009 in EP Application 06758646.1.
Hirofuchi T et al.: USB/IP—a Peripheral 1-24 Bus Extension for Device Sharing over IP Network XP 007901448.
Kimara Andreas, "KVM Switch Solutions," Mar. 1, 2001, Network Technologies Inc., pp. 1-38.
MY Appln. No. PI20061986—Feb. 25, 2010 MyIPO Substantive Examination Adverse Report.
Search Report and Written Opinion mailed Jul. 30, 2007 in International Appln. No. PCT/US2006/015909.
U.S. Appl. No. 09/951,774—Apr. 20, 2005 PTO Office Action.
U.S. Appl. No. 09/951,774—Jan. 3, 2006 PTO Office Action.
U.S. Appl. No. 09/951,774—Sep. 21, 2006 PTO Office Action.
U.S. Appl. No. 09/951,774—Aug. 10, 2007 PTO Office Action.
U.S. Appl. No. 10/792,285—Nov. 13, 2007 PTO Office Action.
U.S. Appl. No. 10/792,285—Jul. 17, 2008 PTO Office Action.
U.S. Appl. No. 11/123,075—Dec. 12, 2006 PTO Office Action.
U.S. Appl. No. 11/123,075—Aug. 9, 2007 PTO Office Action.
U.S. Appl. No. 11/123,075—Apr. 18, 2008 PTO Office Action.
U.S. Appl. No. 11/123,075—Oct. 28, 2008 PTO Office Action.
U.S. Appl. No. 12/618,540—May 11, 2010 PTO Office Action.
European Appln. No. 067586461—May 8, 2009—EPO Office Action.
U.S. Appln. No. 12/618,540—Jul. 27, 2010 PTO Office Action.
U.S. Appln. No. 12/618,540—Feb. 1, 2011 PTO Office Action.
IL Appln. No. 186893—May 5, 2011 Israeli Patent Office Action (with English Translation).
U.S. Appl. No. 12/618,540—Oct. 21, 2011 PTO Office Action.
TW Appln. No. 95115060—Oct. 8, 2012 Taiwan patent office Official Letter.
U.S. Appln. No. 12/618,540—Mar. 15, 2013 PTO Office Action.
U.S. Appl. No. 12/618,540—Jan. 15, 2014 PTO Office Action.
U.S. Appl. No. 12/618,540—Jul. 28, 2014 PTO Office Action.
U.S. Appl. No. 12/618,540—Feb. 6, 2015 PTO Office Action.
U.S. Appl. No. 12/618,540—Jun. 26, 2015 PTO Office Action.
U.S. Appl. No. 12/618,540—Sep. 15, 2015 PTO Office Action.
U.S. Appl. No. 12/618,540—Dec. 3, 2015 PTO Office Action.
IL Appln. No. 186893—Office Action dated Mar. 1, 2016.
EPO Appln. No. 06758646.1—Office Action issued Aug. 6, 2015.

\* cited by examiner

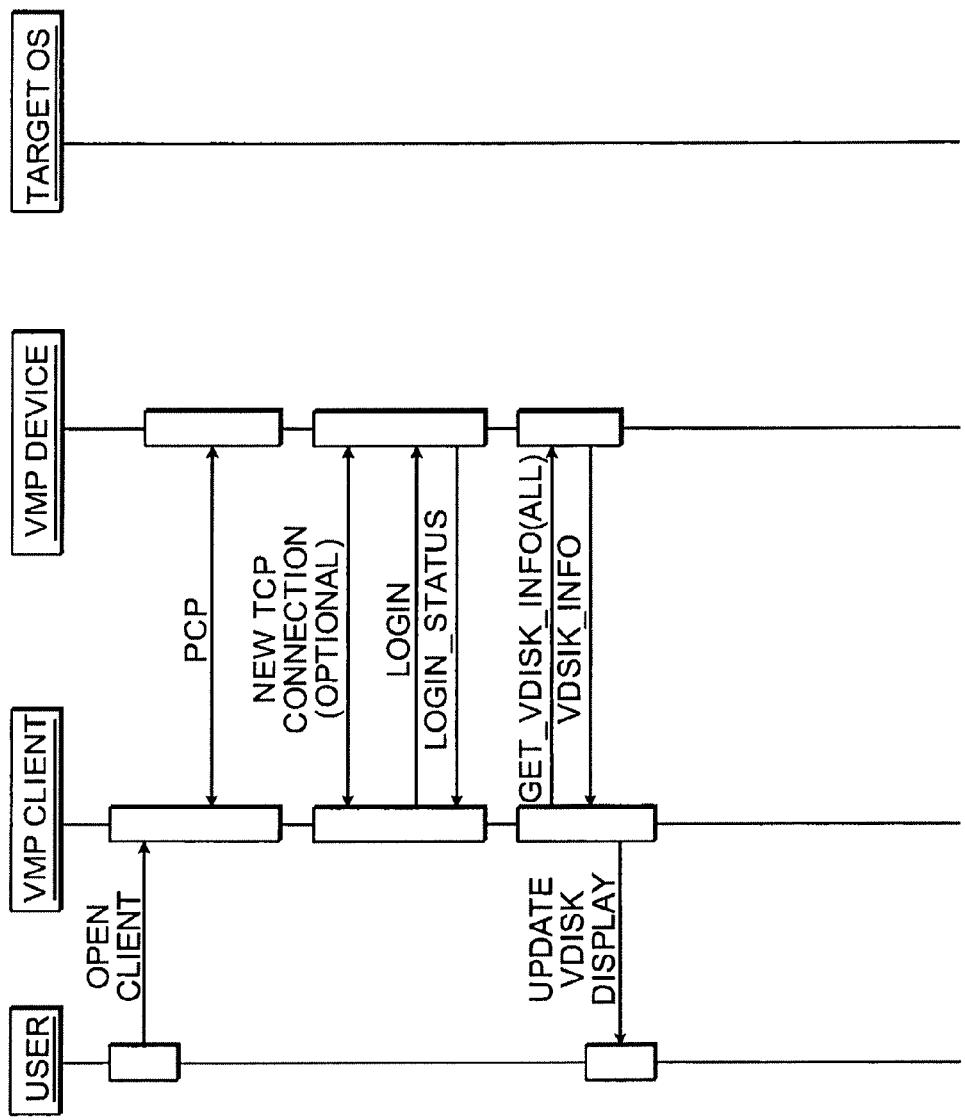

VIRTUAL MEDIA SYSTEMS, METHODS AND DEVICES

RELATED APPLICATIONS

This application is a divisional of U.S. patent application Ser. No. 11/410,084, filed Apr. 25, 2006, now U.S. Pat. No. 7,640,382 and claims priority to U.S. patent application Ser. No. 11/410,084, and U.S. Provisional Patent Application No. 60/675,842, filed Apr. 29, 2005 and entitled "Virtual Media Systems, Methods and Devices," the entire contents of which are fully incorporated herein by reference.

FIELD OF THE INVENTION

This invention relates to data processing systems. More particularly, this invention relates to virtual media and related systems, methods and devices in data processing systems.

BRIEF DESCRIPTION OF THE DRAWINGS

The invention is better understood by reading the following detailed description with reference to the accompanying drawings in which:

FIGS. 5(a)-5(e) are message sequence diagrams;

DETAILED DESCRIPTION OF THE PRESENTLY PREFERRED EXEMPLARY EMBODIMENTS

Background and Overview

KVM (keyboard, video, and mouse) systems that provide remote access to so-called target computers are well known. In such systems, one or more so-called KVM switches, are used to selectively connect remote (client) computers to the keyboard, video and mouse ports of target computers. In this manner, a remote computer can access and control operation of a target computer.

Aspects of KVM systems, switches and related matters, including their operation, are described in the following U.S. patents, the entire contents of each of which are fully incorporated herein by reference:

U.S. Pat. No. 6,304,895; titled "Method and system for intelligently controlling a remotely located computer," filed Jul. 23, 1999 and issued Oct. 16, 2001;

U.S. Pat. No. 6,567,869, titled "KVM switch including a terminal emulator," filed Feb. 22, 2002 and issued May 20, 2003;

U.S. Pat. No. 6,681,250, titled "Network based KVM switching system," filed May 3, 2000 and issued Jan. 20, 2004; and U.S. Pat. No. 6,112,264, titled "Computer interconnection system having analog overlay for remote control of the interconnection switch," filed Feb. 4, 1999 and issued Aug. 29, 2000.

Connection between a client and a KVM switch may be via direct connection (e.g., CAT-5 cable), or it may be over network such as, e.g., an Ethernet-based network or a TCP/IP network or the like.

Architecture

Figure 1:
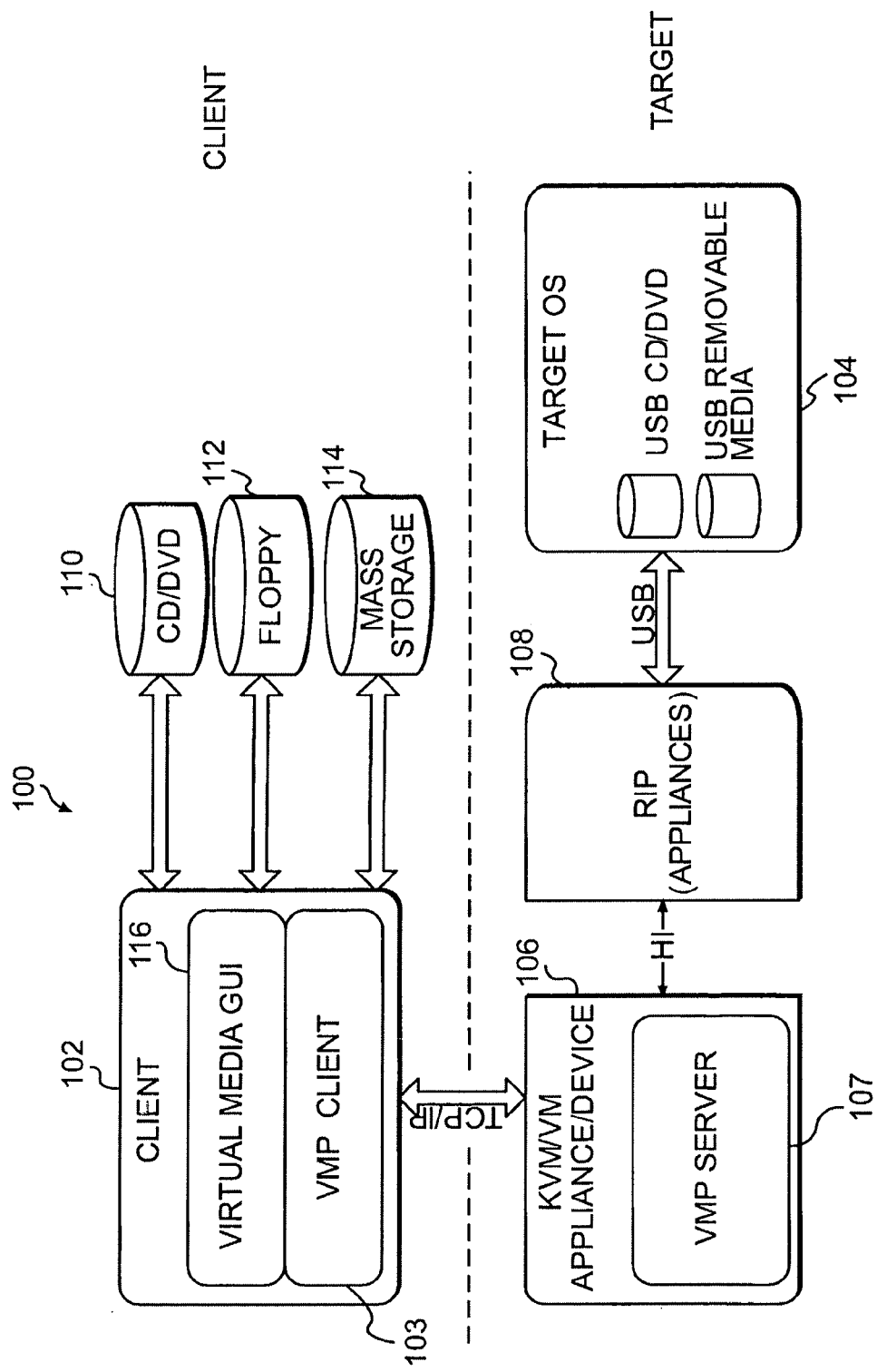
FIG. 1 shows the architecture of a system/framework according to embodiments of the present invention.

FIG. 1 shows an exemplary architecture of a system/framework 100. As shown, for example, in the drawing, a client (computer) 102 can connect to a target (computer/server) 104 via a KVM/VM device (appliance) 106 and an optional connection device such as, e.g., RIP (Rack Interface Pod) 108. An exemplary RIP is described in U.S. patent application Ser. No. 09/951,774, filed Sep. 14, 2001, titled "Passive Video Multiplexing Method And Apparatus," the entire contents of which are incorporated herein by reference. The client connects to the KVM device 106 via a network such as, e.g., a TCP/IP network. The network may be any network such as, e.g., a WAN, LAN, an internet, an intranet or the Internet. The network may include wireless and/or satellite components.

Various actual storage devices, including so-called mass storage devices, may be connected to the client computer 102. For example, as shown, for example, in FIG. 1, client computer 102 has CD/DVD 110, floppy disk 112, and other mass storage device 114, connected thereto. A storage device could be any type of device, including read-only devices, that can connect to the client (or to the appliance), including, without limitation, CD/DVDs, floppies, USB key cards and the like. These devices may be connected to the client via a serial port, USB port, parallel port or in any other manner that allows the client to access (e.g., read and/or write) data on the devices.

The target computer 104 connects to the KVM/VM appliance 106, either directly, or using a RIP 108 (as in the embodiment shown in the drawing). In the case when a RIP 108 is used, the RIP cables are preferably connected to a USB port of the target, and so the RIP and target communicate using the USB protocol, preferably USB 2.0. The RIP communicates with the KVM/VM appliance 106 using a protocol denoted HI (High-speed Interface), and described in greater detail below. The target computer 104 may connect directly to the KVM/VM appliance 106, in which case the target and appliance communicate using the USB protocol via a connection to a USB port of the target. In those cases, where no separate RIP is used, necessary functionality of the RIP may be incorporated into the KVM/VM appliance. For the sake of explanation and description, and without limiting or intending to limit the scope of the invention, the embodiment shown in FIG. 1 will be described herein.

The target computer/server 104 may be any computer, including, without limitation, a server in a server rack, and it may run any operating system (OS).

Those skilled in the art will realize, upon reading this description, that while only one client and one target are shown in FIG. 1, a typical framework 100 according to embodiments of the present invention may include a number of clients, targets and appliances, connected in various ways.

As is well known in the art, the USB protocol has timing requirements and constraints that impose limits on the distance between USB devices and processors connected thereto. The system/framework described overcomes the timing and associated distance constraints of USB systems by providing a spoofing or emulation mechanism in the RIP (or in the appliance) so that, from the client's perspective, it is communicating with a USB device, even though the device may be non-USB and may be further away than conventional USB systems would allow, and may be communicating over a network with non-predictable timing.

Protocols

This section describes the various communications protocols according to embodiments of the present invention. Those of skill in the art will realize and understand, upon reading this description, that different and/or other protocols may be used and are considered to be within the scope of the present invention.

TABLE DTP-1

DTP Change message packet format

| Offset | Field Size | Meaning |
|---|---|---|
| 0 | 1 | Size |
| 1 | 1 | Command (dDTP_CHANGE) |
| 2 | 1 | Sub-command |
| 3 | N | Sub-command parameters |

The sub-command codes are listed below.

TABLE DTP-2

DTP Change protocol sub-commands

| Sub-command | Symbol | Description |
|---|---|---|
| 0x00 | dDTP_SPEED_QUERY | Speed query |
| 0x01 | dDTP_SPEED_RESPONSE | Speed response |
| 0x02 | dDTP_VERSION_QUERY | Version query |
| 0x03 | dDTP_VERSION_RESPONSE | Version response |
| 0x04 | dDTP_SPEED_SELECT | DTP/Speed select |
| 0x05 | dDTP_SPEED_SELECT_RESPONSE | DTP/Speed select response |
| 0x06 | dDTP_PING | Ping |
| 0x07 | dDTP_PING_RESPONSE | Ping response |
| 0x08-0xFF | Reserved | |

The HI Protocol

One protocol (generally denoted HI or AHI) defines operation between the KVM/VM device/appliance 106 and the RIP 108 (or between two appliances). The protocol described herein supports the virtual media aspects of the described system while remaining backwards-compatible with earlier devices and systems. A legacy RIP system is described in U.S. patent application Ser. No. 09/951,774, filed Sep. 14, 2001, the contents of which have been incorporated herein by reference. RIP modules supporting the high speed data link will preferably need to function while connected to an appliance using legacy protocols. Likewise, an appliance that supports the high-speed data link (according to embodiments of the present invention) will preferably need to function with a RIP that only supports the legacy speed (e.g., 38,400 bps).

The HI (AHI) protocol uses three layers for inter-system communication, namely Physical, Transport and Application layers.

The Binary Data Transport Protocol (BDTP), the data transport protocol (DTP) used in legacy systems, is a so-called Master-Slave protocol. The Slave cannot send a message without first being queried by the master. This limits the overall data exchange rate and may not support the Virtual Media features described herein. Accordingly, to retain backward compatibility, the high-speed transport protocol (HI) described here includes a method for switching between protocols. Since HI might run at different transmission speeds, a way to negotiate the new speed is part of the scheme for switching protocols.

DTP Change Protocol

The DTP change protocol is used to change the Data Transport Protocol and/or communications speed. This protocol utilizes a single application message command code (symbol dDTP_CHANGE) with sub-command codes. This helps reduce the total number of commands in the system and allows for future commands.

The format used by all DTP change messages is shown below.

There are two sets of parameters values associated with the sub-commands. These are speed and protocols. These values are used to report, as well as set the parameters. These parameter values are listed below.

TABLE DTP-3

Speed parameter values

| Value | Speed |
|---|---|
| 0x00 | 38,400 bps |
| 0x01 | 24 Mbps |
| 0x02 . . . 0xFF | Reserved for future use |

The 38,400 bps speed is provided as a speed parameter for completeness and for backward compatibility with legacy systems. In practice, in currently preferred implementations, this should never need to be used as it is the default for most systems.

TABLE DTP-4

Protocol parameter values

| Value | DTP |
|---|---|
| 0x00 | BDTP |
| 0x01 | HI |
| 0x02 . . . 0xFF | Reserved for future use |

The BDTP protocol is provided as a protocol parameter for completeness. Since BDTP is the default protocol it is not expected to be used.

Sub-Commands

Speed Query

The speed query sub-command is used to request supported data link speeds.

TABLE DTP-5

Speed query message format

| Offset | Field Size | Meaning |
|---|---|---|
| 0 | 1 | Size (Always 2) |
| 1 | 1 | Command (dDTP_CHANGE) |
| 2 | 1 | Sub-command (dDTP_SPEED_QUERY) |

Speed Response

The speed response sub-command is used to indicate all supported speeds. This message is sent in response to a speed query.

TABLE DTP-6

Speed response message format

| Offset | Field Size | Meaning |
|---|---|---|
| 0 | 1 | Size (3 + (value @ offset 3)) |
| 1 | 1 | Command (dDTP_CHANGE) |
| 2 | 1 | Sub-command (dDTP_SPEED_RESPONSE) |
| 3 | 1 | Number of supported speeds |
| 4 | 1 | First supported speed |
| 5 | 1 | Second supported speed |
| N | 1 | Last supported speed |

Version Query

The version query sub-command is used to determine DTP types and versions.

TABLE DTP-7

Version query message format

| Offset | Field Size | Meaning |
|---|---|---|
| 0 | 1 | Size (Always 2) |
| 1 | 1 | Command (dDTP_CHANGE) |
| 2 | 1 | Sub-command (dDTP_VERSION_QUERY) |

Version Response

The version response sub-command is used to indicate all supported DTPs and versions.

TABLE DTP-8

Version response message format

| Offset | Field Size | Meaning |
|---|---|---|
| 0 | 1 | Size (3 + 2*(value @ offset 3)) |
| 1 | 1 | Command (dDTP_CHANGE) |
| 2 | 1 | Sub-command (dDTP_VERSION_RESPONSE) |
| 3 | 1 | Number of supported DTP/version pairs |
| 4 | 1 | First supported DTP |
| 5 | 1 | First DTP version |
| 6 | 1 | Second supported DTP |
| 7 | 1 | Second DTP version |
| N − 1 | 1 | Last supported DTP |
| N | 1 | Last DTP version |

DTP/Speed Select

The speed select sub-command is used to switch the data link to the indicated speed.

TABLE DTP-9

Speed select message format

| Offset | Field Size | Meaning |
|---|---|---|
| 0 | 1 | Size (Always 4) |
| 1 | 1 | Command (dDTP_CHANGE) |
| 2 | 1 | Sub-command (dDTP_SPEED_SELECT) |
| 3 | 1 | DTP parameter |
| 4 | 1 | Speed parameter |

DTP/Speed Select Response

The speed select response sub-command is used acknowledge a speed change request. The acknowledgment can indicate that an invalid or unsupported speed was requested.

TABLE DTP-10

DTP/Speed select response

| Offset | Field Size | Meaning |
|---|---|---|
| 0 | 1 | Size (Always 3) |
| 1 | 1 | Command (dDTP_CHANGE) |
| 2 | 1 | Sub-command (dDTP_SPEED_SELECT_RESPONSE) |
| 3 | 1 | Response value: |
| | | Value — Description |
| | | 0x00 — Reserved - Could be a unintentional value |
| | | 0x01 — Request accepted - changing to requested protocol & speed |
| | | 0x02 — Requested protocol not supported |
| | | 0x03 — Invalid protocol requested |
| | | 0x04 — Requested speed not supported |
| | | 0x05 — Invalid speed requested |
| | | 0x06-0xFF — Reserved |

Ping

The ping sub-command is used to test the newly established link. The master, after receiving the DTP/Speed select response (request accepted) will wait until the communication link has been established then send the ping sub-command. This provides positive feedback that the link is online & operating properly.

TABLE DTP-11

Ping message format

| Offset | Field Size | Meaning |
|---|---|---|
| 0 | 1 | Size (Always 2) |
| 1 | 1 | Command (dDTP_CHANGE) |
| 2 | 1 | Sub-command (dDTP_PING) |

Ping Response

The ping-response sub-command is sent (as the name implies) in response to the ping sub-command. It is used to give positive feedback to the master that the slave has properly changed protocols and/or speed.

TABLE DTP-12

Ping response message format

| Offset | Field Size | Meaning |
|---|---|---|
| 0 | 1 | Size (Always 2) |
| 1 | 1 | Command (dDTP_CHANGE) |
| 2 | 1 | Sub-command (dDTP_PING_RESPONSE) |

Sequence

Figure 2:
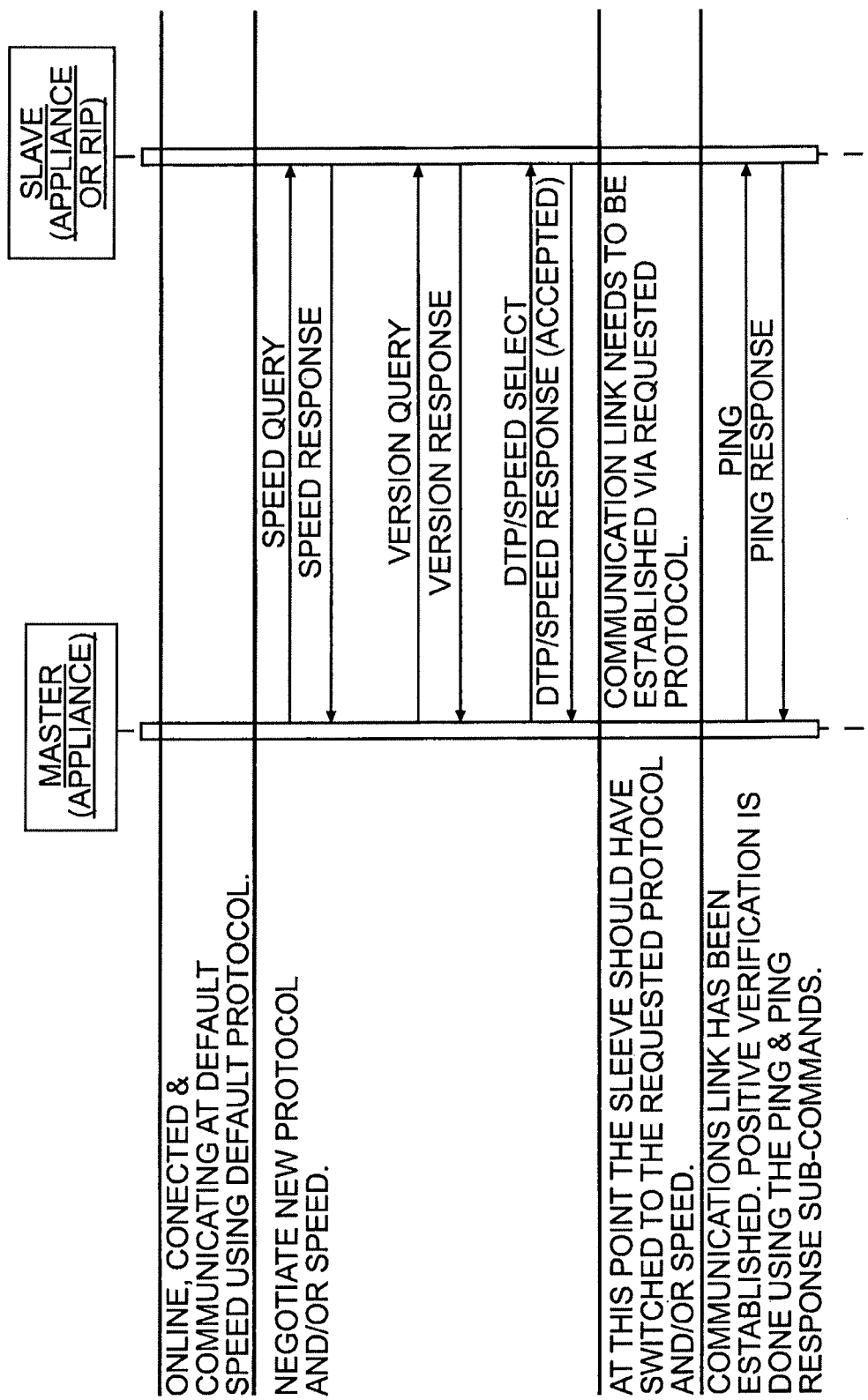
FIG. 2 shows a sequence of messages used to change (Data Transport Protocol) DTP/speed.

An exemplary sequence of messages used to change DTP/speed is shown in the diagram in FIG. 2.

Error Handling

In presently preferred embodiments, the data link always reverts back to the default protocol and speed when either side determines the data link has been lost. This method could cause an oscillation between protocols and/or speeds if there are problems with the physical connection. The two sides might communicate acceptably at the default and both sides properly negotiate the change in protocol/speed only to fail to communicate at the negotiated protocol/speed causing the link to revert back to the default. Therefore, the following method is established to prevent this oscillation: The master keeps track of the number of protocol changes over time. If the number of changes exceeds a limit in a time period the master will no longer attempt to change protocol/speed. If the connection is lost at the default protocol and speed the whole process will start over.

Assumptions about HI Data Transport Protocol

While the Data Transport Protocol and Message Protocol are separate, some discussion and understanding of the basic DTP operation is provided.

HI-DTP Uses

The HI-DTP is a general purpose Data Transport Protocol that may be used for the following:
  Communicate between an appliance and a USB/VM-RIP
  Communicate between two appliances
  Communicate between an appliance and a RIP used to tier into an appliance.

Data Paths

Command Data Path

The command data path should always be available. That is, as long as the data link can accept data (buffers not full) a command can be passed from one side to the other.

Bulk Data Path

In presently preferred exemplary embodiments, the bulk data path cannot be multiplexed. The data on the bulk data path are automatically transferred to a specific memory location upon receipt (preferably performed using Direct Memory Access—DMA). The command path is used to set the purpose of the bulk data path. The target memory location is set by the processor. Note that a command will be sent to tell the other side of the link that the bulk data path is ready for a specific use. All data received on the bulk data path are copied (or moved) to the target memory location upon receipt. This continues until the processor changes the target memory location.

The RIP sets the target memory location to the USB endpoint buffer during initialization. After that, all data received on the bulk data path are placed directly into USB endpoint buffers without the intervention of the RIP processor. For the ACI (input) port, the appliance may or may not change the target memory location, depending on data throughput requirements.

Reflected Status

The reflected status is always available.

Virtual Media Message Protocol

The Virtual Media Control command set supports the chosen RIP hardware which supports two block transfer devices identified by Logical Unit Number (LUN). These share a single input buffer and a single output buffer. The USB host will only communicate with a single device at a time. Because of this and the HI-DTP providing a separate "Bulk Data path", the VM command set does not need to provide a set of commands to indicate data packets. The read/write block commands set the function of the bulk data path.

Virtual Media Control Packet Definitions

The Virtual Media Control protocol utilizes a single application message command code (0xB0, symbol dCMD_VIR-TUAL_MEDIA) with sub-command codes. This helps reduce the total number of commands in the system and allows for future commands.

The following sub-commands are defined:

TABLE VM-13

Virtual Media Control Sub-commands

| Value | Symbol | Description |
|---|---|---|
| 0x00 | dVMC_ACK | Acknowledge a VMC command |
| 0x01 | dVMC_MAP | Map a virtual drive |
| 0x02 | dVMC_UNMAP | Unmap a virtual drive |
| 0x03 | dVMC_READ_TOC | Read virtual drive's table of contents (for CD/DVD support) |
| 0x04 | dVMC_READ_CAPACITY | Read virtual drive's block size and block count |
| 0x05 | dVMC_READ_BLOCK | Read a block from the virtual drive |

TABLE VM-13-continued

Virtual Media Control Sub-commands

| Value | Symbol | Description |
|---|---|---|
| 0x06 | dVMC_WRITE_BLOCK | Write a block to the virtual drive |
| 0x07 | dVMC_ABORT | Abort current VMC command and flush all USB buffers. |
| 0x08 | dVMC_VERSION_QUERY | Requests the VM command protocol version |

All messaging used within the presently preferred exemplary embodiments use network byte order, defined as: The order in which the bytes of a multi-byte number are transmitted on a network—most significant byte first (as in "big-endian" storage). This may or may not match the order in which numbers are normally stored in memory for a particular processor.

TABLE VM-14

Virtual Media Control: ACK packet format (generic)
Virtual Media Control: ACK (dVMC_ACK)

| Offset | Size | Description |
|---|---|---|
| 0 | 1 | Command Size (variable 4 + n) |
| 1 | 1 | Virtual Media Control Command Code (0xB0) |
| 2 | 1 | VMC ACK sub-command code (0x00) |
| 3 | 1 | VMC sub-command code being ACKed |
| 4 | 1 | Result Code (0 = Success) |
| 5 | N | VMC Command specific results |

Each VMC command has a description of ACK packs.

TABLE VM-15

Virtual Media Control: Unsupported command

| Offset | Size | Description |
|---|---|---|
| 0 | 1 | Command Size (4) |
| 1 | 1 | Virtual Media Control Command Code (0xB0) |
| 2 | 1 | VMC ACK sub-command code (0x00) |
| 3 | 1 | VMC sub-command code being ACKed |
| 4 | 1 | Result Code (0xFF = Invalid/unsupported command) |

When an invalid or unsupported command is received, the receiver will respond with a dVMC_ACK packet with the result field set to 0xFF indicating an invalid or unsupported command (see Table VM-15).

Virtual Media Control: Map (dVMC_MAP)

This command is used to map a virtual drive to a RIP USB Mass Storage interface. This command is sent from the Appliance to the RIP. The format of the command is as follows:

TABLE VM-16

Virtual Media Control: Map command packet format

| Offset | Size | Description | |
|---|---|---|---|
| 0 | 1 | Command Size (0x03) | |
| 1 | 1 | Virtual Media Control Command Code (0xB0) | |
| 2 | 1 | VMC Map Drive sub-command code (0x01) | |
| 3 | 1 | Logical Unit Number (LUN) | |
| | | 0x00 | Virtual CD/DVD |
| | | 0x01 | Virtual Floppy/Removable drive |
| | | 0x02 ... 0xFF | Undefined and invalid |

TABLE VM-17

Virtual Media Control: Map response packet format

| Offset | Size | Description | |
|---|---|---|---|
| 0 | 1 | Command Size (0x05) | |
| 1 | 1 | Virtual Media Control Command Code (0xB0) | |
| 2 | 1 | VMC ACK sub-command code (0x00) | |
| 3 | 1 | VMC Map Drive sub-command code (0x01) | |
| 4 | 1 | Result | |
| | | 0x00 | Success |
| | | 0x01 | Invalid LUN |
| | | 0x02 | LUN already mapped |
| | | 0x03 ... 0xFF | Undefined |
| 5 | 1 | LUN | |

Virtual Media Control: UnMap (dVMC_UNMAP)

This command is used to stop mapping a virtual drive to a RIP USB Mass Storage interface. This command is sent from the Appliance to the RIP. The format of the command is as follows:

TABLE VM-18

Virtual Media Control: UnMap command packet format

| Offset | Size | Description | |
|---|---|---|---|
| 0 | 1 | Command Size (0x03) | |
| 1 | 1 | Virtual Media Control Command Code (0xB0) | |
| 2 | 1 | VMC UnMap Drive sub-command code (0x02) | |
| 3 | 1 | Logical Unit Number (LUN) | |
| | | 0x00 | Virtual CD/DVD |
| | | 0x01 | Virtual Floppy/Removable drive |
| | | 0x02 ... 0xFF | Undefined and invalid |

TABLE VM-19

Virtual Media Control: UnMap response packet format

| Offset | Size | Description | |
|---|---|---|---|
| 0 | 1 | Command Size (0x05) | |
| 1 | 1 | Virtual Media Control Command Code (0xB0) | |
| 2 | 1 | VMC ACK sub-command code (0x00) | |
| 3 | 1 | VMC UnMap Drive sub-command code (0x02) | |
| 4 | 1 | Result | |
| | | 0x00 | Success |
| | | 0x01 | Invalid LUN |
| | | 0x02 | LUN not mapped |
| | | 0x03 ... 0xFF | Undefined |
| 5 | 1 | LUN | |

If the RIP receives this command while data is pending from the indicated LUN, then the RIP will abort the data transfer.

Virtual Media Control: Read TOC (dVMC_READ_TOC)

This command is used to request a Table of Contents from the mapped CD/DVD. This command is sent from the RIP to the Appliance in response to a SCSI Read TOC command received on a USB Mass Storage interface. This command is generally only valid for CD/DVD devices. The format of the command is as follows:

TABLE VM-20

Virtual Media Control: Read TOC command packet format

| Offset | Size | Description |
| --- | --- | --- |
| 0 | 1 | Command Size (0x03) |
| 1 | 1 | Virtual Media Control Command Code (0xB0) |
| 2 | 1 | VMC Read TOC sub-command code (0x03) |
| 3 | 1 | Logical Unit Number (LUN) |
| | | 0x00      Virtual CD/DVD |
| | | 0x01      Virtual Floppy/Removable drive |
| | | 0x02 ... 0xFF      Undefined and invalid |

TABLE VM-21

Virtual Media Control: Read TOC response packet format

| Offset | Size | Description |
| --- | --- | --- |
| 0 | 1 | Command Size (0x06) |
| 2 | 1 | Virtual Media Control Command Code (0xB0) |
| 2 | 1 | VMC ACK sub-command code (0x00) |
| 3 | 1 | VMC Read TOC sub-command code (0x03) |
| 4 | 1 | Result |
| | | 0x00      Success |
| | | 0x01      Invalid LUN |
| | | 0x02      LUN not mapped |
| | | 0x03 ... 0xFF      Undefined |
| 5 | 1 | LUN |
| 6 | 1 | Data Pending |
| | | 0x00      TOC data transmission complete |
| | | 0x01      TOC data transmission pending |
| | | 0x02 ... 0xFF |

When the Appliance receives the VMC Read TOC command, it generates a VMC ACK response with the Data Pending field set to 0x01 indicating data transmission is pending.

After the TOC has been sent through the appropriate USB buffer, the Appliance will generate a VMC ACK response with the Data Pending field set to 0x00 indicating the USB data transmission is complete and the RIP can now generate a USB CSW on the USB Mass Storage interface.

Virtual Media Control: Read Capacity (dVMC_READ_CAPACITY)

This command is used to request the Capacity of the mapped device. This command is sent from the RIP to the Appliance in response to a SCSI Read Capacity command received on a USB Mass Storage interface. The format of the command is as follows:

TABLE VM-22

Virtual Media Control: Read Capacity command packet format

| Offset | Size | Description |
| --- | --- | --- |
| 0 | 1 | Command Size (0x03) |
| 1 | 1 | Virtual Media Control Command Code (0xB0) |
| 2 | 1 | VMC Read Capacity sub-command code (0x04) |
| 3 | 1 | Logical Unit Number (LUN) |
| | | 0x00      Virtual CD/DVD |
| | | 0x01      Virtual Floppy/Removable drive |
| | | 0x02 ... 0xFF      Undefined and invalid |

TABLE VM-23

Virtual Media Control: Read Capacity response packet format

| Offset | Size | Description |
| --- | --- | --- |
| 0 | 1 | Command Size (0x0D) |
| 1 | 1 | Virtual Media Control Command Code (0xB0) |
| 2 | 1 | VMC ACK sub-command code (0x00) |
| 3 | 1 | VMC Read Capacity sub-command code (0x04) |
| 4 | 1 | Result |
| | | 0x00      Success |
| | | 0x01      Invalid LUN |
| | | 0x02      LUN not mapped |
| | | 0x03 ... 0xFF      Undefined |
| 5 | 1 | LUN |
| 6 | 4 | Block Count (in Network Byte Order [i.e., big-endian]) |
| 10 | 4 | Block Size (in Network Byte Order [i.e., big-endian]) |

The Block Count field indicates the number of blocks the logical unit provides. The Block Size field indicates the number of 8-bit bytes in each block. Therefore the logical unit's capacity in bytes can be determined by Block Count multiplied by Block Size.

Virtual Media Control: Read Block (dVMC_READ_BLOCK)

This command is used to request to Read a block, or number of contiguous blocks, from the mapped device. This command is sent from the RIP to the Appliance in response to a SCSI Read (10) command received on a USB Mass Storage interface. The format of the command is as follows:

TABLE VM-24

Virtual Media Control: Read Block command packet format

| Offset | Size | Description |
| --- | --- | --- |
| 0 | 1 | Command Size (0x0B) |
| 1 | 1 | Virtual Media Control Command Code (0xB0) |
| 2 | 1 | VMC Read Block sub-command code (0x05) |
| 3 | 1 | Logical Unit Number (LUN) |
| | | 0x00      Virtual CD/DVD |
| | | 0x01      Virtual Floppy/Removable drive |
| | | 0x02 ... 0xFF      Undefined and invalid |
| 4 | 4 | Start LBA (in Network Byte Order [i.e. big-endian]) |
| 8 | 4 | Block Count (in Network Byte Order [i.e. big-endian]) |

TABLE VM-25

Virtual Media Control: Read Block response packet format

| Offset | Size | Description |
| --- | --- | --- |
| 0 | 1 | Command Size (0x06) |
| 1 | 1 | Virtual Media Control Command Code (0xB0) |
| 2 | 1 | VMC ACK sub-command code (0x00) |
| 3 | 1 | VMC Read Block sub-command code (0x05) |
| 4 | 1 | Result |
| | | 0x00      Success |
| | | 0x01      Invalid LUN |
| | | 0x02      LUN not mapped |
| | | 0x03 ... 0xFF      Undefined |
| 5 | 1 | LUN |
| 6 | 1 | Data Pending |
| | | 0x00      Data transmission complete |
| | | 0x01      Data transmission pending |
| | | 0x02 ... 0xFF |

When the Appliance receives the VMC Read Block command, it generates a VMC ACK response with the Data Pending field set to 0x01 indicating data transmission is pending.

After the Block(s) has (have) been sent through the appropriate USB buffer, the Appliance will generate a VMC ACK response with the Data Pending field set to 0x00 indicating the USB data transmission is complete and the RIP can now generate a USB CSW on the USB Mass Storage interface.

Virtual Media Control: Write Block (dVMC_WRITE_BLOCK)

This command is used to Write a block, or number of contiguous blocks, to the mapped device. This command is sent from the RIP to the Appliance in response to a SCSI Write (10) command received on a USB Mass Storage interface. The format of the command is as follows:

TABLE VM-26

Virtual Media Control: Write Block command packet format

| Offset | Size | Description | |
|---|---|---|---|
| 0 | 1 | Command Size (0x0B) | |
| 1 | 1 | Virtual Media Control Command Code (0xB0) | |
| 2 | 1 | VMC Write Block sub-command code (0x06) | |
| 3 | 1 | Logical Unit Number (LUN) | |
| | | 0x00 | Virtual CD/DVD |
| | | 0x01 | Virtual Floppy/Removable drive |
| | | 0x02 ... 0xFF | Undefined and invalid |
| 4 | 4 | Start LBA (in Network Byte Order [i.e. big-endian]) | |
| 8 | 4 | Block Count (in Network Byte Order [i.e. big-endian]) | |

TABLE VM-27

Virtual Media Control: Write Block response packet format

| Offset | Size | Description | |
|---|---|---|---|
| 0 | 1 | Command Size (0x06) | |
| 1 | 1 | Virtual Media Control Command Code (0xB0) | |
| 2 | 1 | VMC ACK sub-command code (0x00) | |
| 3 | 1 | VMC Write Block sub-command code (0x06) | |
| 4 | 1 | Result | |
| | | 0x00 | Success |
| | | 0x01 | Invalid LUN |
| | | 0x02 | LUN not mapped |
| | | 0x03 ... 0xFF | Undefined |
| 5 | 1 | LUN | |
| 6 | 1 | Data Pending | |
| | | 0x00 | Data receiving complete |
| | | 0x01 | Data receiving pending |
| | | 0x02 ... 0xFF | |

When the Appliance receives the VMC Write Block command, it generates a VMC ACK response with the Data Pending field set to 0x01 indicating the Master is waiting to receive data. After the Block(s) has been received through the appropriate USB buffer, the Appliance will generate a VMC ACK response with the Data Pending field set to 0x00 indicating the USB data reception is complete and the RIP can now generate a USB CSW on the USB Mass Storage interface.

Virtual Media Control: Abort (dVMC_ABORT)

This command is use to abort any current VMC transaction (i.e. any transactions that send a dVMC_ACK packet with the Data Pending field SET). The format of the command is as follows:

TABLE VM-28

Virtual Media Control: Abort command packet format

| Offset | Size | Description |
|---|---|---|
| 0 | 1 | Command Size (0x03) |
| 1 | 1 | Virtual Media Control Command Code (0xB0) |
| 2 | 1 | VMC Abort sub-command code (0x07) |
| 3 | 1 | Logical Unit Number (LUN) |

TABLE VM-28-continued

Virtual Media Control: Abort command packet format

| Offset | Size | Description |
|---|---|---|
| | | 0x00 Virtual CD/DVD |
| | | 0x01 Virtual Floppy/Removable drive |
| | | 0x02 ... 0xFF Undefined and invalid |

TABLE VM-29

Virtual Media Control: Abort response packet format

| Offset | Size | Description | |
|---|---|---|---|
| 0 | 1 | Command Size (0x05) | |
| 1 | 1 | Virtual Media Control Command Code (0xB0) | |
| 2 | 1 | VMC ACK sub-command code (0x00) | |
| 3 | 1 | VMC Abort sub-command code (0x07) | |
| 4 | 1 | Result | |
| | | 0x00 | Success |
| | | 0x01 | Invalid LUN |
| | | 0x02 | LUN not mapped |
| | | 0x03 ... 0xFF | Undefined |
| 5 | 1 | LUN | |

When the Appliance receives the dVMC_ABORT command, the Appliance will flush its USB buffers and transmit a dVMC_ACK command in response.

Virtual Media Control: Version Query (dVMC_VERSION_QUERY)

The version query sub-command is used to request the virtual media protocol version.

TABLE VM-30

Virtual Media Control: Version Query command packet format

| Offset | Size | Description |
|---|---|---|
| 0 | 1 | Command Size (0x02) |
| 1 | 1 | Virtual Media Control Command Code (0xB0) |
| 2 | 1 | VMC Version Query sub-command code (0x08) |

When an Appliance or RIP receives the dVMC_VERSION_QUERY command, the device will transmit the following dVMC_ACK response.

TABLE VM-31

Virtual Media Control: Version Query response packet format

| Offset | Size | Description | |
|---|---|---|---|
| 0 | 1 | Command Size (0x05) | |
| 1 | 1 | Virtual Media Control Command Code (0xB0) | |
| 2 | 1 | VMC ACK sub-command code (0x00) | |
| 3 | 1 | VMC Version Query sub-command code (0x08) | |
| 4 | 1 | Result | |
| | | 0x00 | Success |
| | | 0x01 ... 0xFF | Undefined |
| 5 | 1 | Virtual Media Control Version | |

Virtual Media Control Packet Usage

To explain how the Virtual Media Control packets will be used, we provide some description of how a USB Mass Storage device operates, and a basic description of how the Data Transport layer operates. Those skilled in the art will understand how these devices and layers operate.

Data Transport Layer Overview

An overview of the data transport layer is given here, although those skilled in the art will understand how the layer operates. Essentially, each end of the link maintains two buffers in each direction (for a total of four buffers). These buffers are used for the following:

Application Buffer for exchange of Application Protocol packets

USB Bulk Buffer for transferring bulk USB data for Mass Storage devices

In general, when a frame is received, the Data Transport Layer (FPGA) determines if the payload is Application or USB data. The FPGA then sets a bit flag in the appropriate register indicating data is available (possibly generating an interrupt). Specifically, in presently preferred exemplary embodiments of the present invention, on the RIP, when the Data Transport Layer receives Application data, the FPGA sets an RxRdy flag and if configured, will generate an interrupt. When USB data is received, the FPGA places the received data directly into the MCU's configured endpoint buffer requiring no MCU intervention.

USB Mass Storage Device Overview

Those skilled in the art will know how a USB mass storage device operates, and this description/overview is given here for convenience.

Figure 3:
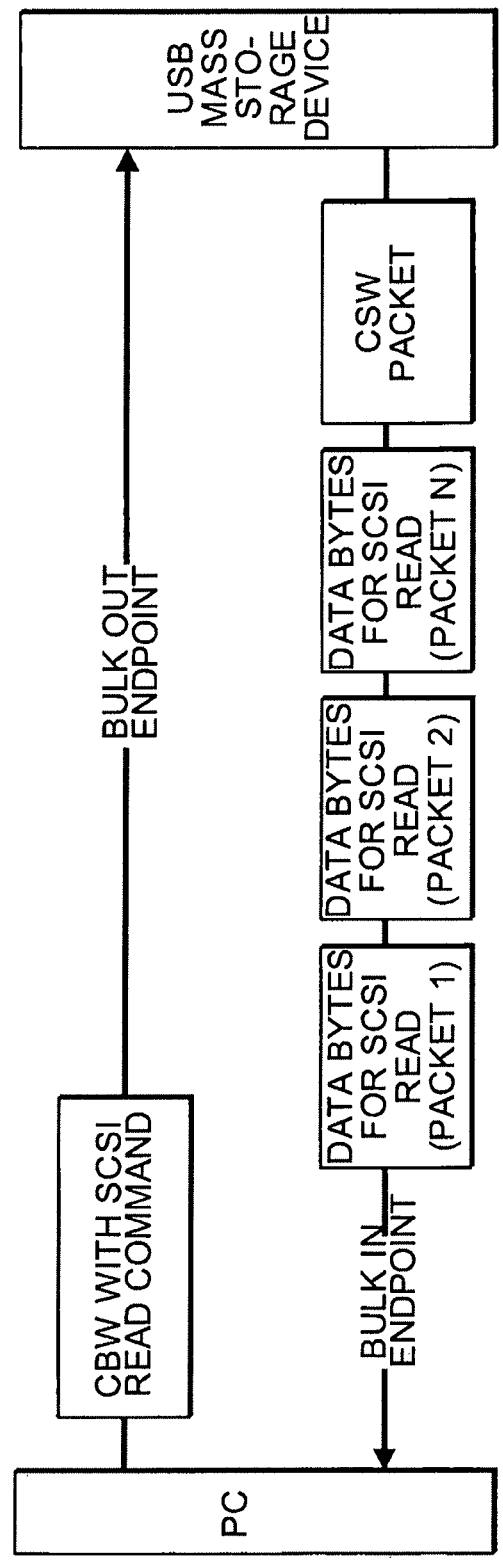
FIGS. 3-4 show reads from Universal Serial Bus (USB) mass storage devices.

A USB Bulk Only Mass Storage device uses two bulk endpoints called Bulk OUT (going from the computer to the device), and Bulk IN (going to the computer from the device). The computer sends commands to the device in a Command Block Wrapper (CBW) using the Bulk OUT endpoint. This CBW contains a SCSI Command that the device decodes. After processing of the SCSI command is complete, the device sends a Command Status Wrapper (CSW) packet to the computer using the Bulk IN endpoint. This CSW contains result information indicating if the SCSI Command completed successfully. FIG. 3 shows a typical read from a USB Mass Storage device.

Data Flow with Virtual Media Control Packets

Figure 4:
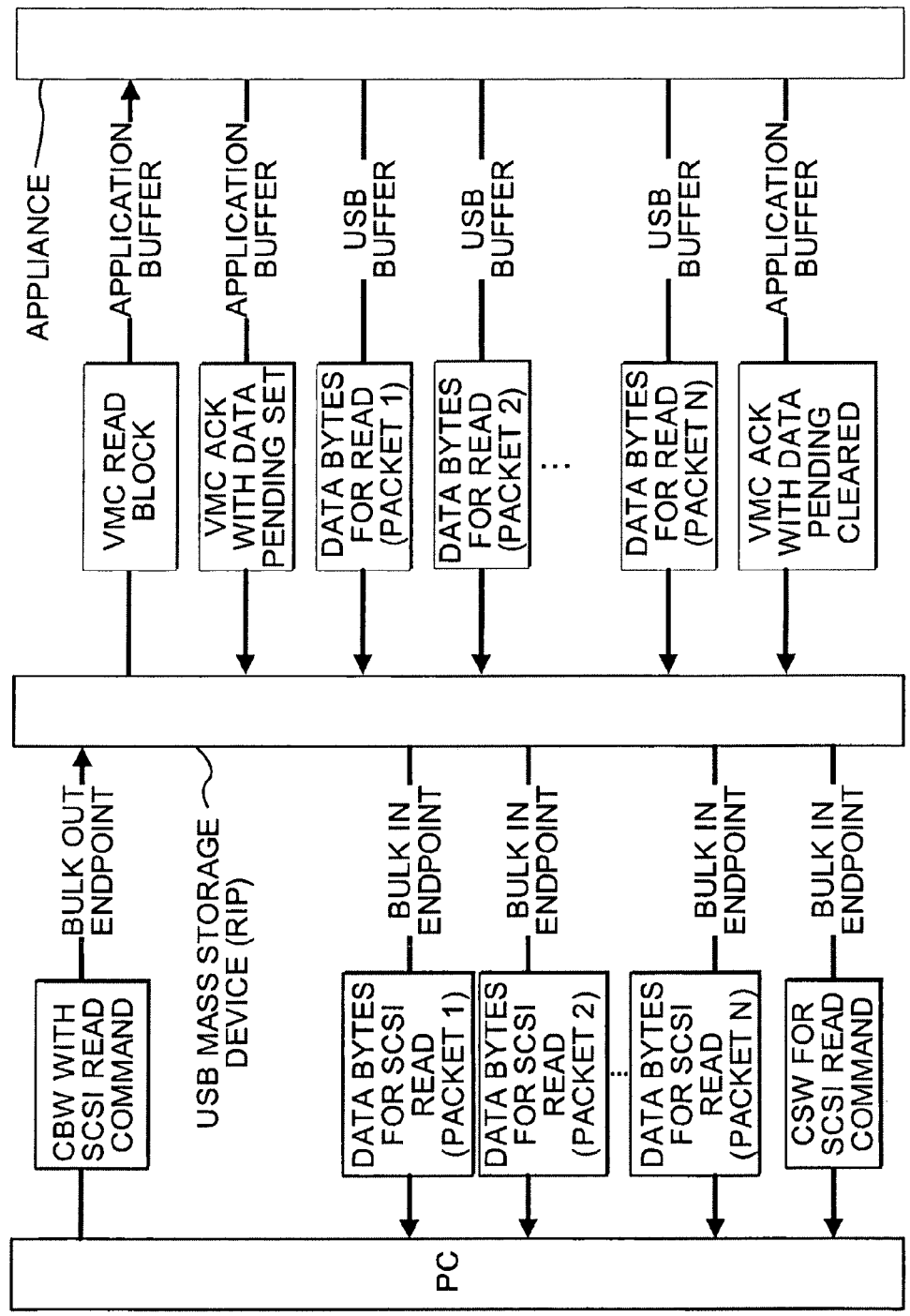

FIG. 4 shows the same read operation as are shown in FIG. 3, but also shows how the dVMC_READ_BLOCK, dVM-C_Ack with data pending SET, and dVMC_Ack with data pending CLEARED Application packets may be used.

Transactions occur between the RIP and Appliance using the Application buffer, and a USB buffer.

Special Considerations—Implementation Details

Various issues are discussed here as they relate to do with interactions between the client (RIP) and the server (appliance). These topics do not relate directly to the protocols.

Server Reboots

Special consideration should be given to the condition where a user has virtual media mapped, and wishes to reboot the attached server. These reboots can be categorized as "warm" boots, where the server remains powered, but performs a reset; and "cold" boots, where the server is power cycled.

"Warm" Boot

Based on experience of the inventors, when a server performs a "warm" boot, the USB bus power may remain constant, but the server may assert a reset condition on the USB bus. In these situations, the RIP maintains power and connectivity to the appliance, and maintains any previous virtual media mappings.

"Cold" Boot

Because the RIP draws its power from the attached server, when the server is power cycled, the RIP loses power, and loses all connection and virtual media mappings.

Appliance Considerations

To support "cold" booting servers in appliances, the appliance preferably maintains state information regarding current user connections so that if a user has an active connection to a RIP, and the data link to the RIP is lost (which likely happens when the attached server is powered down), when the data link returns (when the server is powered up again), the Appliance reconnects the user to the RIP. This same reconnection mechanism also remembers virtual media connections, and remaps virtual media connections to allow the RIP to use virtual media to boot the attached server. So, in presently preferred exemplary embodiments, when an Appliance establishes a HI link with a RIP, the Appliance issues appropriate Virtual Media Control Map and UnMap commands to return the RIP's virtual media mappings to the proper state.

RIP Considerations

To support "cold" booting, the RIP should allow time for the HI link to be established to determine how to respond to the servers SCSI requests. If the HI link is not established within a certain timeout period, or if the RIP received a Virtual Media Control: UnMap command, then the RIP responds to the server as a Removable Media device with no media present. If the RIP receives a Virtual Media Control Map packet, then the RIP responds to the server as a Removable Media device with media present.

Until the timeout expires, or the RIP receives the Virtual Media Control: Map or UnMap packet, the RIP responds as a Removable Media device that is in the process of becoming ready (similar to responses given by CD/DVD and HDD units that are spinning up).

Virtual Media Protocol

This section describes a common network command set for communicating with virtual media devices according to embodiments of the present invention. This protocol will be referred to as the Virtual Media Protocol (VMP). In presently preferred embodiments, the VMP is used between a VMP client 103 in a client 102 and a VMP server 107 in an appliance 106 (e.g., see FIG. 1).

Connection Establishment

The Client initiates all Virtual Media sessions, e.g., using the Primary Connection Protocol ("PCP") protocol (described below). Once the PCP transactions have taken place and the socket connection and use of SSL have been determined, then virtual media transactions may take place according to the VMP protocol.

If at any time the connection is broken between the Client and the virtual media device, the device will consider the Client logged out and the connection (e.g., the TCP connection) between the two will be closed.

Conventions

Throughout this description the Message ID codes will have the most significant bit set for messages that are either bidirectional or sent from Device to Client. All messages share a common 12-byte header and all multi-byte parameters are transmitted in network byte order (Big Endian).

Virtual Media Protocol

Virtual Media Protocol (VMP) messages are used for transmitting virtual media data. The term "vDisk" is sometimes used herein to refer to a virtual disk or, more generally, to virtual media. They will be sent over the connection (e.g., the TCP connection) specified by the PCP protocol. The vDisk IDs are zero (0) based and the value 0xFF is used to indicate the command applies to all vDisks. In the presently preferred exemplary embodiments, all commands should be treated atomically. In other words, while one VMP command sequence is in progress no other command may be initiated. This provides for protocol simplicity.

LOGIN_CREDENTIALS (Type 0x0100)

TABLE VMP 32

Username and Password Login

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | Reserved | 2 | Reserved for future use. Set to 0. |
| 12 | User Name Length | 1 | Number of characters in user name string. |
| 13 | User Name | 16*6 | Name of user attempting to login. This field is a UTF-8 encoded string. Six bytes are reserved for each of the 16 possible characters. For the English language where ASCII text codes are used no more than 16 bytes will be required. |
| 109 | AuthResult | 32 | This is the result of a double MD5 hash on the AuthData form the SESSION_SETUP message, the username, and the password. |
| 141 | RIP ID | 8 | Packed hex digits of RIP ID. 8 bytes can hold 16 digits. |
| 149 | Port Number | 1 | Non-zero to select by port number (1-16). Zero to select by RIP ID. |
| 150 | Cascaded Port Number | 1 | Non-zero to select a cascaded port (1-24) |
| 151 | Share Mode | 1 | Not used, should be set to zero. |
| 152 | Pre-empt | 1 | Set to 1 to request pre-emption. |

This message is used for user login and channel selection. The device will respond to this message with a User Login Status message.

For some systems or products there may be two types of channel selections are possible with this message. With some appliances the Port Number and Cascaded Port Number fields may be used to select channels. With other appliances the RIP ID and Cascaded Port Number fields may be used to select channels. Embedded solutions may require application specific implementations.

LOGIN_CERTIFICATE (Type 0x0101)

TABLE VMP 33

Certificate Login

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | Reserved | 2 | Reserved for future use. Set to 0. |

This message is used when user login and channel selection was performed via an X509 session certificate exchange as part of the establishment of the Primary Connection SSL link (established, e.g., using the Primary Connection Protocol—PCP). If the Primary Connection SSL link was not established via an X509 session certificate exchange, then this message cannot be used. Immediately after the Primary Connection establishment with the device this message, or a Type 0x100 message, should be the first one received from the client. All other messages will be ignored until a successful login and channel selection is performed. The device will respond to this message with a User Login Status message.

All parameters for the user authentication and channel selection should be contained within the certificate that was exchanged with the digital media appliance when the Primary Connection SSL link was established.

LOGIN_RANDOM NUMBERS (Type 0x0102)

TABLE VMP 34

Random Numbers Login

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | Reserved | 2 | Reserved for future use. Set to 0. |
| 12 | Client Random Number | 4 | Random number client used to establish an existing VSP session with the appliance. |
| 16 | Appliance Random Number | 4 | Random number provided by the appliance when an existing VSP session was established with the appliance |
| 20 | Share Mode | 1 | Not used, should be set to zero. |
| 21 | Pre-empt | 1 | Set to 1 to request pre-emption. |

This message is used for user login and channel selection. The device will respond to this message with a User Login Status message.

Two types of channel selections are used with this message in presently preferred exemplary embodiments. When used with some appliances the Port Number and Cascaded Port Number fields are used to select channels. When used with some other appliances the RIP ID and Cascaded Port Number fields are used to select channels.

In presently preferred exemplary embodiments, this type of login is available if a VSP (video session) connection has been made between a client and the appliance and is still in use. That video session with the VSP connection should provide the random numbers necessary for this login.

Login Status (Type 0x8100)

TABLE VMP 35

Login Status message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | Reserved | 2 | Reserved for future use. Set to 0. |
| 12 | Login Status | 1 | Indicates success or failure of user login and channel selection. (see Table 3-6) |
| 13 | Miscellaneous Status | 1 | Bit field where each bit represents a certain status item<br>Bit  Meaning<br><br>0  If set, user to be pre-empted has right to reject pre-emption request (valid only if Login Status Code = 50 or 51) |
| 14 | User Name Length | 1 | Number of characters in user name string. |
| 15 | User Name | 16*6 | When a channel selection fails because the selection is in use, this field gives the user's name that is using the channel. This field is a UTF-8 encoded string. Six bytes are reserved for each of the 16 possible characters. For the English language where ASCII text codes are used no more than 16 bytes will be required. |

TABLE 36

Login Status Codes

| Value | Description |
|---|---|
| 0 | Success. |
| 1 | Invalid user name/client random number |
| 2 | Invalid password/appliance random number |
| 3 | Channel access denied. |
| 4 | Channel in use. |
| 5 | Channel not found. |
| 6 | Channel in use and requesting user has rights to pre-empt.. |
| 7 | Channel in use by local user. |
| 8 | All channels in use. |
| 9 | User access denied (user does not have access rights to channel). |
| 10 | User locked out. |
| 11 | Channel in use by local user and requesting user has rights to pre-empt.. |
| 12 | Channel in use by exclusive local user. |
| 13 | Channel upgrade in progress. |
| 14 | Channel in use by Exclusive User. |
| 15 | Share denied by existing user (user has denied the share request). |
| 16 | Share request timeout (user did not respond to share request). |
| 17 | Exclusive connection denied because channel is already in use. |
| 18 | Channel not available due to PEM blockage. |
| 19 | Channel not available due to PEM blockage and requesting user has rights to pre-empt. |
| 20 | Channel not available due to PEM blockage by local user. |
| 21 | Channel not available due to PEM blockage by local user and requesting user has rights to pre-empt. |
| 50 | Channel in use by local user and requesting user has rights to pre-empt, pre-empt rejection rights of other user and timeout information provided. |
| 51 | Channel in use and requesting user has rights to pre-empt, pre-empt rejection rights of other user and timeout information provided. |
| 52 | Preemption login request rejected by other user. |

This message is sent from the device to the user in response to a login messages.
Session Control
Disconnect (Type 0x8110)

TABLE VMP 37

User Disconnect Pending with Timeout message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | Reserved | 2 | Reserved for future use. Set to 0. |
| 12 | Disconnect Reason | 1 | 0 = Administrator disconnect<br>1 = Session idle timeout exceeded<br>2 = Appliance reboot pending<br>3 = DSRIQ upgrade pending<br>4 = Channel preempted by local user<br>5 = Reserved (don't use)<br>6 = Disconnect due to KVM lock (KVM session closed with lock active) |
| 13 | Status | 1 | Bit field where each bit represents a certain status item<br>Bit  Meaning<br>0  Reserved<br>1  Reserved<br>2  Reserved<br>3  Reserved<br>4  Reserved<br>5  Reserved<br>6  Reserved<br>7  If set, user to be pre-empted has right to reject pre-emption request. If not set, the user to be pre-empted may not reject the pre-emption. |
| 14 | Pre-emption Timeout Value | 1 | Maximum number of seconds that the user who is being pre-empted has to respond to the pre-emption request. After the timeout expires the user software should close the user session. |

This message is sent from the Device to the Client when an administrator or local user requests that the user's session be terminated. This message contains a timeout value that determines how long the Client should wait before terminating the session. During that timeout value, and before the user has terminated their own session, a Cancel User Disconnect Pending With Timeout (Type 0x8304) message may be received that will cancel this message.
DISCONNECT_CANCEL (Type 0x8120)

TABLE VMP 38

Cancel User Disconnect Pending with Timeout message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | Reserved | 2 | Reserved for future use. Set to 0. |
| 12 | Cancel Reason | 1 | 0 = Requesting User has cancelled disconnect request |

This message is sent from the Device to the Client when an administrator or local user requests that the user's session be terminated and then cancels that request. This message will only be sent if a User Disconnect Pending with Timeout (Type 0x8303) has been sent first.

Heartbeat (Type 0x0400)

TABLE VMP 39

Cancel User Disconnect Pending with Timeout message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | Reserved | 2 | Reserved for future use. Set to 0. |

This message is sent periodically from the client to the appliance when the client has no other useful message to send. If the appliance does not receive any messages from the client for a period of 1 minute the appliance will assume the client connection is no longer active and will terminate the VM session. This is used to insure that lost network connections and broken clients do not permanently consume VM connections. The recommended behavior of the client is to send "Heartbeat" messages once every 10 seconds when needed, although one skilled in the art will realize, upon reading this description, that other time intervals are possible and within the scope of the invention.

vDISK (Virtual Media) Control
GET_VDISK_INFO (Type 0x0200)

TABLE VDisk-40 vDisk Info Request message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | Reserved | 2 | Reserved for future use. Set to 0. |

This message is sent to request information about the virtual media (vDisks) available on the device and what the current status is for each of the virtual media.

VDISK_INFO (Type 0x8200)

TABLE VDisk--41 vDisk Info message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | vDisk ID | 2 | Reserved for future use. Set to 0. |
| 12 | Number of drives | 2 | Number of vDisks supported on device |

TABLE VDisk-42 vDisk Info block

| 12 + 4n | Drive Type | 1 | 0x01 - Floppy/Memory Key<br>0x02 - CD/DVD ROM<br>0x04 - Generic |
| 13 + 4n | Drive Status | 1 | 0 - Idle (Available for mapping)<br>1 - Attached (Currently Mapped)<br>2 - Disabled (Disabled via VDISK_SET_ENABLE)<br>3 - Broken (An unrecoverable error has occurred) |
| 14 + 4n | Drive Capabilities | 2 | 0x0001 -Enable/Disable Support |

This message is sent in response to a GET_VDISK_INFO. The drive type and drive status fields are repeated once for each virtual medium/vDisk present on the device.

VDISK_REQUEST (Type 0x0210)

TABLE VDisk-43 vDisk Request message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | vDisk ID | 2 | Indicate which vDisk this command is for |
| 12 | Block Size | 4 | Logical block size for this vDisk |
| 16 | Number of Blocks | 4 | Number of logical blocks for this vDisk |
| 20 | Drive Flags | 1 | 0x01 - Force Read Only |
| 21 | Max Write Blocks | 1 | Maximum number of blocks that should be sent in a single write command. This should be set to zero for a read only device. |
| 22 | TOC Size | 2 | Number of bytes in the Table of Contents which follows this message (0 for non-CD DriveType, maximum of 804 for CD DriveTypes) |
| 24 | Data | Variable | Optional Table of Contents data |

The vDisk Request command is sent from the client to the device when a file system (drive or file system image) is attached. Number of Blocks defines the size in blocks of the file system being opened, and Block Size defines the block size of the device being opened. Drive Flags specifies any special qualities for the drive. Currently the only supported flag is the Read Only flag that is used to indicate the device should present a read only interface to the Target. Max Write Blocks specifies the maximum number of data blocks the device may place in a single write command. This is intended to prevent buffer overruns in the Client. TOC Size indicates the length of the CD Table of Contents data contained in the Data section of the message. If the TOC data is unknown or the drive type is mass storage, this field should be set to 0. In presently preferred exemplary embodiments, the maximum size of the TOC data is 804 bytes. If the target USB is not enumerated the device should respond with a DEVICE_STATUS message indicating the USB is not connected.

VDISK_RELEASE (Type 0x0220)

TABLE VDisk-44 vDisk Release message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header |
| 8 | Message Type | 2 | Type code for the message |

TABLE VDisk-44-continued vDisk Release message format

| Offset | Field Name | Length | Description |
|---|---|---|---|
| 10 | vDisk ID | 2 | Indicate which vDisk this command is for |

This command is sent from the Client to the Device to release a vDisk resource that was previously allocated using the VDISK_REQUEST command. The Device returns a Status message in response to this command. On the target device it should appear that the media has simply been removed from the virtual drive. This should not cause a USB reset or re-enumeration.

VDISK_SET_ENABLE (Type 0x0230)

TABLE VDisk-45 vDisk Set Enable message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header |
| 8 | Message Type | 2 | Type code for the message |
| 10 | vDisk ID | 2 | Indicate which vDisk this command is for |
| 12 | Enabled | 1 | 0 = Disable Drive<br>1 = Enable Drive |

This command is used to enable or disable the associated drive. When a drive is disabled it will cause the required USB interfaces to be re-enumerated such that the indicated drive will no longer be visible to the target operating system (OS). The device returns a DEVICE_STATUS message in response to this command.

VDISK_REQUEST_RELEASE (Type 0x8240)

TABLE VDisk-46 vDisk Request Release message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header |
| 8 | Message Type | 2 | Type code for the message |
| 10 | vDisk ID | 2 | Indicate which vDisk this command is for |
| 12 | Enabled | 1 | 0 = Disable Drive<br>1 = Enable Drive |

This command may be sent when the target server attempts to eject a mapped drive. The device returns a DEVICE_STATUS message in response to this command.

vDISK Data Operations

VDISK_READ (0x8300)

TABLE VDisk-47 vDisk Read Request message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header |
| 8 | Message Type | 2 | Type code for the message |

TABLE VDisk-47-continued vDisk Read Request message format

| Offset | Field Name | Length | Description |
|---|---|---|---|
| 10 | vDisk ID | 2 | Indicate which vDisk this command is for |
| 12 | Start Block | 4 | Starting logical block number |
| 16 | Number of Blocks | 4 | Number of contiguous blocks to read |
| 20 | Blocking Factor | 4 | Maximum number of blocks to send per message |

The Read command is sent to requesting block(s) of data from the client's attached file system. Start Block and Number of Blocks define which block and how many blocks to transfer. The Blocking Factor parameter tells the client the maximum number of blocks that may be transferred per message. If the total number of blocks requested is greater than BlockingFactor, the client will reply with multiple messages containing no greater than Blocking Factor blocks per message, until the total number of requested blocks has been sent. So, for example, if the server requests 240 blocks, and the Blocking Factor is 64, then the client will respond four times, with 64, 64, 64, and 48 blocks, respectively.

VDISK READ_DATA (0x0300)

TABLE VDisk-48 vDisk Read Response message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | vDisk ID | 2 | Indicate which vDisk this command is for |
| 12 | Start Block | 4 | Starting logical block number |
| 16 | Number of Blocks | 4 | Number of contiguous blocks contained in this message. |
| 20 | Data | Variable | |

This message is used to deliver data that has been read from the local device. The Number of Blocks should not exceed the blocking factor specified in the VDISK_READ Request message.

VDISK_WRITE (Type 0x8310)

TABLE VDisk-49 vDisk Write Request message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | vDisk ID | 2 | Indicate which vDisk this command is for |
| 12 | Start Block | 4 | Starting logical block number |
| 16 | Number of Blocks | 4 | Number of contiguous blocks in this message |
| 20 | Data | Variable | Data to be written |

This command is sent to request that block(s) of data be written to the client's file system. This command will only be valid when a file system is opened in read/write mode. The client returns a CLIENT_STATUS message in response to this command. The Start Block parameter determines where to write, and Number of Blocks tells how many blocks are included in the Data portion of the message.

VDISK_GET_ALTERNATE_TOC_DATA (0x8320)

TABLE VDisk-50 vDisk Get Alternate TOC Data message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header |
| 8 | Message Type | 2 | Type code for the message |
| 10 | vDisk ID | 2 | Indicate which vDisk this command is for |
| 12 | MSF | 1 | 0 = LBA Format, 1 = MSF Format |
| 13 | Format | 1 | TOC Format |
| 14 | Track/Session | 1 | Starting Track or Session |

This command is sent to request Table of Content data in a format other than that which is included in the VDISK REQUEST message.

VDISK_ALTERNATE_TOC_DATA (0x0320)

TABLE VDisk-51 vDisk Alternate TOC Data message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header |
| 8 | Message Type | 2 | Type code for the message |
| 10 | vDisk ID | 2 | Indicate which vDisk this command is for |
| 12 | TOC Data Length | 2 | Length of the alternate TOC data |
| 14 | TOC Data | Variable | TOC data in the format requested by the device |

Miscellaneous

DEVICE_STATUS (Type 0x8410)

TABLE VDisk-52

Device Status message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | vDisk ID | 2 | Indicate which vDisk this command is for |
| 12 | Status | 4 | Indicates the status returned by the last command |

This message is sent in response to several commands. Possible values of the Status field are as follows:

TABLE VDisk-53

VMP status codes

| Value | Error Description |
|---|---|
| 0x00000000 | OK |
| 0x00000001 | COMMAND_NOT_SUPPORTED |
| 0x00000002 | READ_FAILED |
| 0x00000003 | WRITE_FAILED |
| 0x00000004 | USB_NOT_CONNECTED |
| 0x00000005 | DRIVE_ALREADY_ATTTACHED |

TABLE VDisk-53-continued

VMP status codes

| Value | Error Description |
|---|---|
| 0x00000006 | DRIVE_DISABLED |
| 0x00000007 | UNKNOWN_CONFIGURATION_OPTION |

USB not Connected

This is a message from the server to the client indicating that USB is powered off or not connected. This will usually be sent after a VDISK_REQUEST command. This error is not fatal. (The VDISK_REQUEST should still succeed.) However, when receiving this message the client should display a warning to the user that USB is disconnected or powered off Command Not Supported This message will be returned whenever a client or server receives a command that is not supported. This message will be used primarily to indicate an optional command is not supported.

Read Failed

This message is sent in response to a VDISK_READ command when the Client cannot fetch the data requested.

Write Failed

This message is sent in response to a VDISK_WRITE command when the Client cannot write the data requested.

Unknown Configuration Option

This message is sent in response to a SET_CONFIGURATION_OPTION command when the Client does not recognize the Option Id that was specified.

CLIENT_STATUS (Type 0x0410)

TABLE VDisk-54

Client Status message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | vDisk ID | 2 | Indicate which vDisk this command is for |
| 12 | Status | 4 | Indicates the status returned by the last command |

See DEVICE_STATUS for details.

USB_RESET (Type 0x0420)

TABLE VDisk-55

USB Reset message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | vDisk ID | 2 | Indicate which vDisk this command is for |

This command forces a reset of the USB that in turn will cause a re-enumeration of the devices. A composite device will have no choice but to reset all devices whereas a compound device should only reset the associated device. This command should only be used as a last resort due to the implications it has on composite devices. The device returns a Status message in response to this command.

CLIENT_CONFIGURATION_OPTION (Type 0x0430)

TABLE VDisk-56

Client Configuration Option message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | vDisk ID | 2 | Indicate which vDisk this command is for |
| 12 | Option ID | 4 | This is defined on a per-implementation basis |
| 16 | Option Data Length | 4 | Length of the Option Data field |
| 20 | Option Data | Variable | Data specific to the indicated Option ID |

This command is used to send configuration options to the device asynchronously. Presently known values for the Client Configuration Option message are as follows:

TABLE VDisk-57

Known Client Configuration Options

| Option ID | Description | Option Data Length Value | Option Data |
|---|---|---|---|
| 0x00000001 | Reserve option changed in client | 1 | 0x00 = Reserve not active 0x01 = Reserve active |

DEVICE_CONFIGURATION_OPTION (Type 0x8430)

TABLE VDisk-58

Device Configuration Option message format

| Offset | Field Name | Length | Description |
|---|---|---|---|
| 0 | Start of Header | 4 | 0x41, 0x56, 0x4D, 0x50 ("VMP") |
| 4 | Length | 4 | Length of entire message including the header. |
| 8 | Message Type | 2 | Type code for the message |
| 10 | vDisk ID | 2 | Indicate which vDisk this command is for |
| 12 | Option ID | 4 | This is defined on a per-implementation basis |
| 16 | Option Data Length | 4 | Length of the Option Data field |
| 20 | Option Data | Variable | Data specific to the indicated Option ID |

This command is used to send configuration options to the client asynchronously. Presently known values for the Device Configuration Option message are as follows:

TABLE VDisk-59

Known Device Configuration Options

| Option ID | Description | Option Data Length Value | Option Data |
|---|---|---|---|
| 0x00000001 | READ_ONLY - All drives should be set to read-only. If read-only is true, then the user cannot change the read-only setting of a drive. If read-only is not true, then certain drive types, such as CD/DVD will be read-only, but other drives, such as a floppy, will allow the user to determine whether they should be read-only, or not. | 1 | 0 = false, READ-ONLY not set 1 = true, READ-ONLY set. |
| 0x00000002 | LOCKED - The KVM and Virtual Media sessions are locked. When the KVM session closes the appliance will also close the Virtual Media session | 1 | 0 = false, LOCKED not set 1 = true, LOCKED set |

Primary Connection Protocol (PCP)

This section describes a common network command set for establishing communication between a device (usually an appliance) and a client (usually running on a workstation) in preparation for using another KVM-type protocol. This protocol will hereafter be referred to as the Primary Connection Protocol (PCP).

Connection Establishment

In presently preferred implementations, the Client will initiate all sessions using a non-SSL TCP/IP connection. The client will make the TCP/IP connection to the device on a defined TCP port on which the device is listening for PCP connections. The client starts the capabilities exchange process by sending a SESSION_REQUEST message. This message should list all of the connection options supported by the client as well as desired protocol version. The device will respond with a SESSION_SETUP message indicating the specific connection options to use. If the session is to use an SSL connection then both sides will initiate the SSL handshake at this point.

After the initial connection the Client and the appliance will communicate using the protocol specified in the SESSION_REQUEST, on the TCP port specified by the SESSION_SETUP (The need for a new connection will be indicated by a non-zero value for the TCP Port.)

SSL implements industry standards for encryption using Transport Layer Security version 1 (TLSv1). All data over an SSL connection will use DES, 3DES, AES, or 128 bit (RC4 like) encryption algorithms. When establishing an SSL connection it is desirable that X509 certificates be presented and authenticated by both the device and the Client. If certificates are not available from both the Client and the device, then anonymous Diffie-Hellman key exchange will be used.

Conventions

Throughout this section the Message ID codes will have the most significant bit set for messages that are either bidirectional or sent from Device to Client. All multibyte parameters are transmitted in network byte order (Big Endian).

These are the messages used for the Primary Connection Protocol.

Session Establishment

SESSION_REQUEST (0x0100)

TABLE PCP-60

Connection Capabilities

| Offset | Field Name | Length | Description |
|---|---|---|---|
| 0 | Start of Header | 4 | 0x41, 0x50, 0x43, 0x50 ("PCP") |
| 4 | Length | 4 | Length of entire message including the header. |
| 8 | Message Type | 2 | Type code for the message |
| 10 | Reserved | 2 | Reserved for future use. Set to 0. |
| 12 | Protocol Type | 1 | The protocol to be associated with this session. |
| 13 | Version Major | 1 | Major Version Number. |
| 14 | Version Minor | 1 | Minor Version Number. |
| 15 | Reserved | 1 | Reserved for future use. Set to 0. |
| 16 | Capabilities Flags | 4 | Supported connection capabilities. (see Table PCP-62) |
| 20 | AuthRandomLen | 1 | Length of random data used for authentication hash (bytes) |
| 21 | AuthRandom | 32 | Random number to be hashed with username and password |

TABLE PCP-61

Protocol Types

| Value | Description |
|---|---|
| 1 | PCP |
| 2 | AVMP |
| 3 | AVSP Primary Connection |
| 4 | AVSP Secondary Connection |
| 5 | ASMP |

TABLE PCP-62

Connection Capabilities

| Value | Description |
|---|---|
| 0x00000000 | NONE (used only in the SESSION_SETUP response to indicate no connection capabilities exist, i.e. SESSION_REQUEST failed) |
| 0x00000001 | TCP (Cleartext) |
| 0x00000002 | TCP (RC4) |
| 0x00000004 | SSL (Anonymous) |
| 0x00000008 | SSL (Certificates) |
| 0x00000100 | KEEP_ALIVE |

This should be the first message sent from a client to a device once the TCP connection is established. The device should receive this message within 30 seconds of connection establishment or terminate the connection. The SESSION_REQUEST message is used to request the connection type, protocol type, and report version information. Upon receipt of this request the Device will send a SESSION_SETUP message to the Client to indicate that the message was received, and what type of connection was requested.

SESSION_SETUP (0x8100)

TABLE PCP-63

Connection Capabilities

| Offset | Field Name | Length | Description |
|---|---|---|---|
| 0 | Start of Header | 4 | 0x41, 0x50, 0x43, 0x50 ("PCP") |
| 4 | Length | 4 | Length of entire message including the header. |
| 8 | Message Type | 2 | Type code for the message |
| 10 | Reserved | 2 | Reserved for future use. Set to 0. |
| 12 | Version Major | 1 | Major Version Number. |
| 13 | Version Minor | 1 | Minor Version Number. |
| 14 | Capabilities Flags | 4 | Negotiated connection capabilities. (see Table PCP-62) |
| 18 | TCP Port | 2 | TCP Port to be used for the new session (0 = current connection) |
| 20 | AuthRandomLen | 1 | Length of random data used for authentication hash (bytes) |
| 21 | AuthRandom | 32 | Random number to be hashed with username and password |

This message is sent from the device to the client in response to a Session Setup Request message. The message's receipt indicates to the client to commence its SSL handshake (if any) on the port specified in the TCP port field (zero indicates to use the current connection). After the SSL handshake (if any) has been completed the protocol in use, such as VMP or VSP, will be the protocol specified in the SESSION_REQUEST message and the use of this protocol will end.

The Rack Interface Pod (RIP)

This section provides some details of the rack interface pod (RIP).

As shown, for example, in FIG. 1, a RIP 108 may be used to connect a target/server to an appliance. In such cases, the RIP preferably connects to the target/server via a single USB connector, through which multiple logical connections provide keyboard, mouse, and storage media functions. The keyboard and mouse functions will be the same as for existing USB RIPs. Those skilled in the art will realize, upon reading this description, that the functionality of the RIP may be incorporated into PCI card, a daughter board, a mother board, an embedded solution or the like.

In presently preferred exemplary embodiments, the virtual media USB connection is capable of providing throughput equivalent to a 32×USB CD-ROM. The RIP may present itself as containing two USB devices: presently a CD and a removable mass storage device. Once the target device enumerates these devices, the RIP maintains the connection regardless of the state of user virtual media sessions. The RIP reports an empty condition for the media devices when no user media session is established.

Figure 9A:
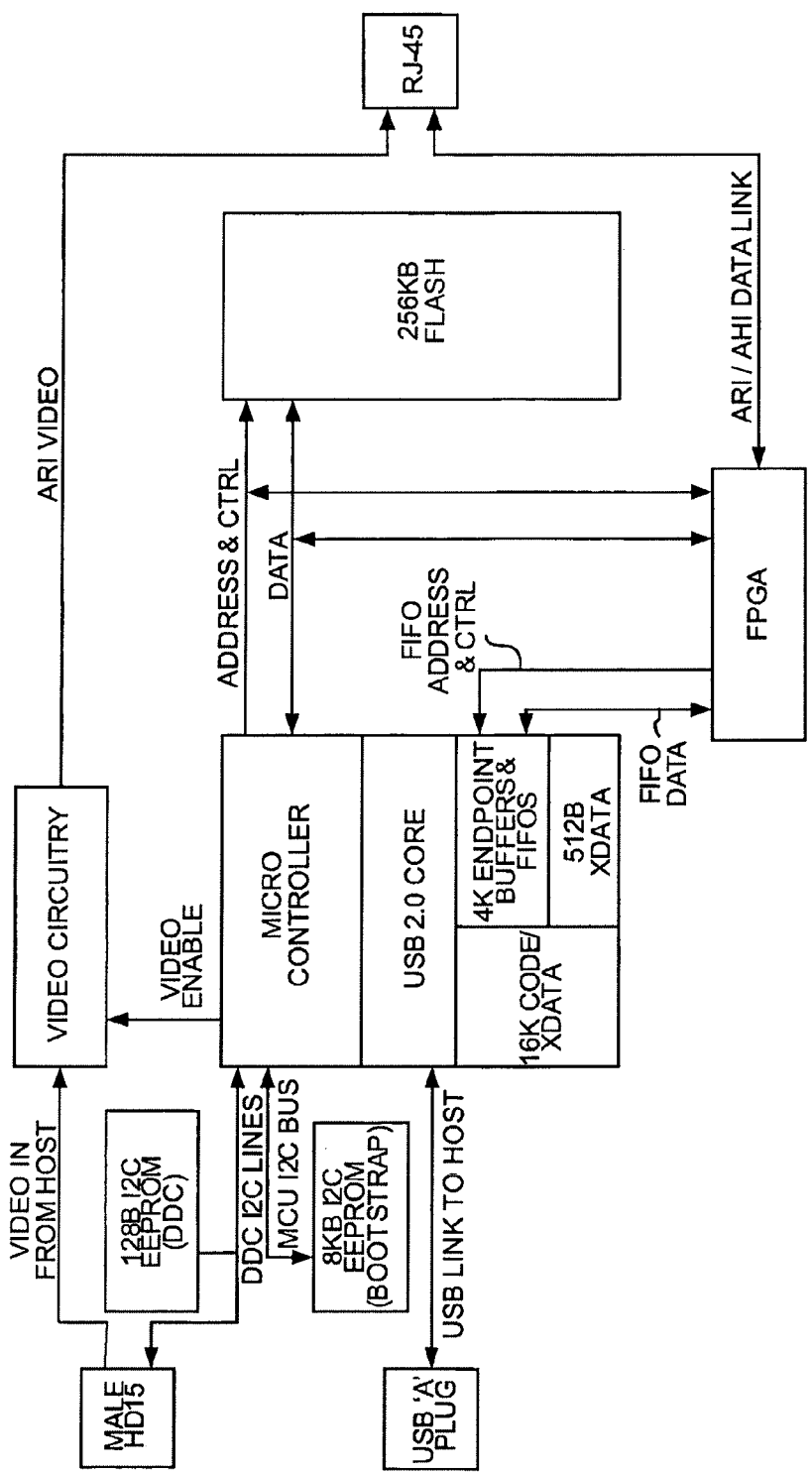
FIGS. 9(a)-9(b) are block diagrams of aspects of a RIP (Rack Interface Pod)
Figure 9B:
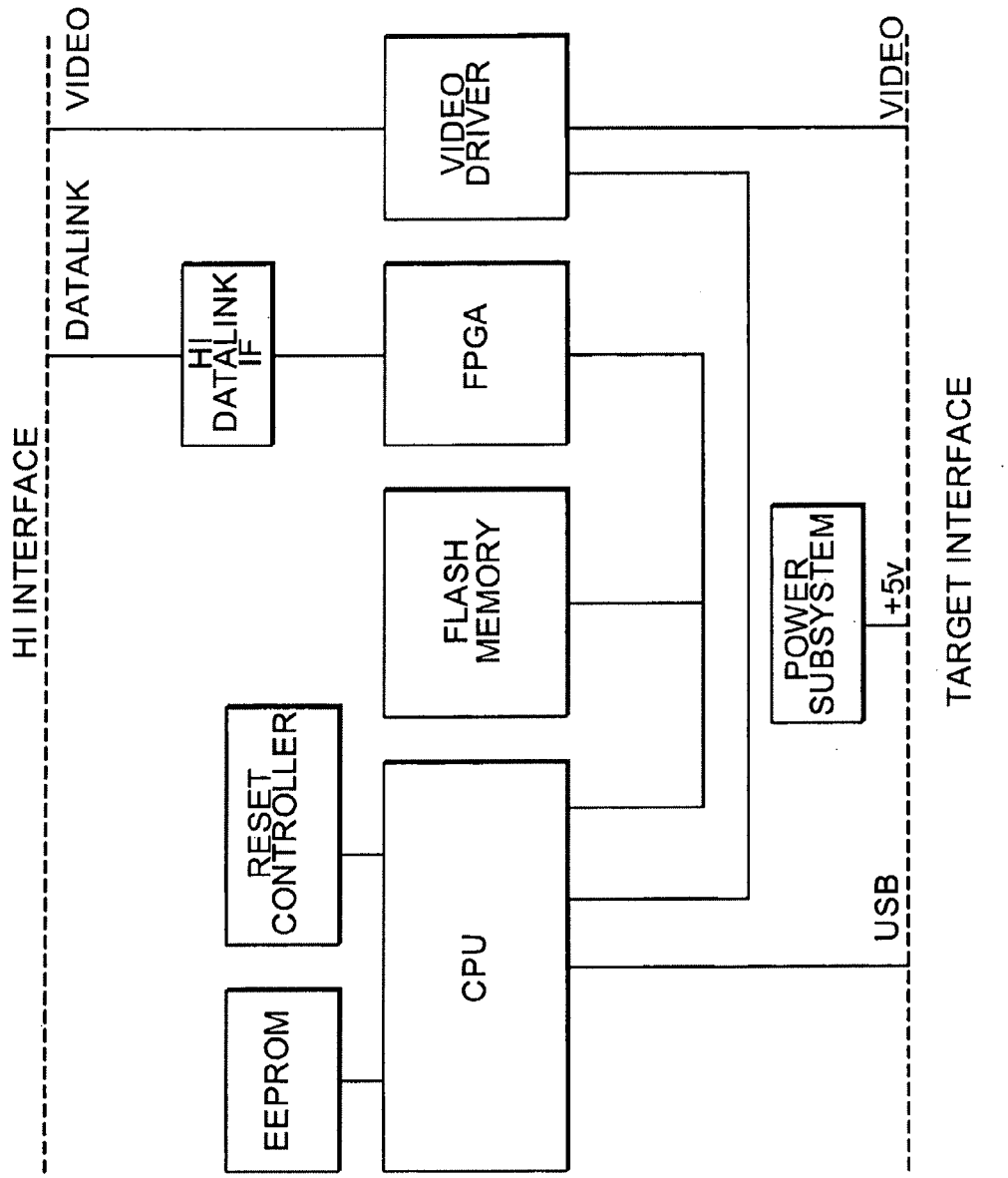

FIGS. 9(*a*)-9(*b*) are block diagrams of aspects of a RIP according to embodiments of the present invention. In a presently preferred embodiment, the RIP is based on a Cypress CY680013LP USB2.0 Microprocessor, often referred to as an FX2. The FX2 incorporates an 8051 CPU core and a USB2.0 PHY and Parallel Interface Engine (PIE). The PIE is capable of supporting multiple data sources, including external sources via internal FIFOs.

The FX2 boots from a code image stored in an ancillary EEPROM and will execute application code from a FLASH memory. The FPGA implements a high speed serial interface for transferring data between an appliance and the High Speed RIP.

In the present implementations, the system has the following components:
Digital Subsystem
FPGA Logic
  The FPGA is a Xilinx XC3S50TQ100-4C
  The HI Datalink utilizes a 74ACT244 for configuration and drive, and FPGA based receivers.
Microprocessor Logic
The EEPROM which stores the CPU Boot Image is implemented as a 24LC64
The CPU is implemented as a CY680013LP in a 128QFP package
The Flash Memory is an SST39VF020 2 Mbit organized as 256K×8 with 4 KB sectors.
The power on reset is a TC1276-10
Video Subsystem
The video subsystem is based on the EL4543 integrated ARI video driver.
Power Subsystem
The power subsystem has been implemented in two ways: as two synchronous buck regulators; one 3.3V, and one 1.2V. An LDO will generate 2.5V from the 3.3V supply, and as one 3.3V synchronous buck regulator and a 2.5V LDO and a 1.2V LDO.

FPGA Hardware/Software Interface
Memory Map
Control and Status Interface RIP

The Control and Status Interface Controls the modes and the operation of the datalink interface. This portion of the implementation also includes a reflected interface between ends of the Interface, when in high speed mode. The following table shows the RIP register addresses.

TABLE RIP-64

| Register Addresses | | |
|---|---|---|
| Address | R/W | Description |
| 0x00 | R/W | HS Datalink CSR1 |
| 0x01 | R/W | HS Datalink CSR2 |
| 0x02 | R/W | Reflected Register Out |
| 0x03 | R | Reflected Register In |
| 0x04 | R/W | RI UART CSR |
| 0x05 | R/W | RI UART Data |
| 0x06 | R/W | Application FIFO CSR |
| 0x07 | R/W | Application FIFO |
| 0x08 | R/W | Application Packet Length |
| 0x09 | R/W | USB Bulk CSR |
| 0x0A | | Unused |
| 0x0B | | Unused |
| 0x0C | | Unused |
| 0x0D | R/W | MCU Bank Address |
| 0x0E | R/W | MCU EA CR |
| 0x0F | W | Watchdog Timer |
| 0x10 ... 0x1D | | Unused |
| 0x1E | R/W | Scratch Register |
| 0x1F | R | RIP Version |

RIP Register Definitions
HS Datalink CSR1 (0x00)

TABLE RIP-65

| HS Datalink CSR1 (0x00) | | | | | | | |
|---|---|---|---|---|---|---|---|
| Bit Number | | | | | | | |
| 7 | 6 | 5 | 4 | 3 | 2 | 1 | 0 |
| Read MODE | | | | | | Link_On Master | Link Active |
| Write MODE | | | | | | Link_En Master | |

MODE Operating mode of the data link/line interface

| Value | Speed |
|---|---|
| 0 | 38.4 KBaud |
| 1 | 24 MBaud |
| 2 ... 7 | Reserved |

Master For debug/development purposes. A 1 indicates this module will act as a master (Default=0)
Link Active 1 indicates the FPGA considers the link active
Line_En Turns on the datalink logic
HS Datalink CSR 2 (0x01)

TABLE RIP-66

| S Datalink CSR2 (0x01) | | | | | | | |
|---|---|---|---|---|---|---|---|
| Bit Number | | | | | | | |
| 7 | 6 | 5 | 4 | 3 | 2 | 1 | 0 |
| Read | | ErrorCount | | | | | |
| Write | | | | | | | ResetErr |

ErrorCount Total number of errors (Timeouts+NAKed frames) no-rollover

ResetErr Writing any value cause the ErrorCount value to be reset

Reflected Resister OUT (0x02)

TABLE RIP-67

| Reflected Register OUT (0x02) | | | | | | | | |
|---|---|---|---|---|---|---|---|---|
| | Bit Number | | | | | | | |
| | 7 | 6 | 5 | 4 | 3 | 2 | 1 | 0 |
| Read/Write | D7 | D6 | D5 | D4 | D3 | D2 | D1 | D0 |

Value to be presented to the master's (Appliance) "Reflected Register IN" register.

Reflected Register IN (0x03)

TABLE RIP-68

| Reflected Register IN (0x03) | | | | | | | | |
|---|---|---|---|---|---|---|---|---|
| | Bit Number | | | | | | | |
| | 7 | 6 | 5 | 4 | 3 | 2 | 1 | 0 |
| Read/Write | D7 | D6 | D5 | D4 | D3 | D2 | D1 | D0 |

Value from the master (Appliance) "Reflected Register"

RI UART CSR (0x04)

TABLE RIP-69

| RI (low speed) UART CSR (0x04) | | | | | | | |
|---|---|---|---|---|---|---|---|
| | Bit Number | | | | | | |
| | 7 | 6 | 5 | 4 | 3 | 2 | 1 | 0 |
| Read | LOOPBACK | 0 | 0 | TxEmty | TxFull | RxRdy | TxIrqEn | RxIrqEn |
| Write | LOOPBACK | | | | | | TxIrqEn | RxIrqEn |

RxIrqEn Enable interrupt on RxRdy

TxIrqEn Enable interrupt on TxEmpty

RxRdy Indicates there is RX data available

TxFull Indicates the TX FIFO is full, any additional bytes written to the FIFO will be lost TxEmty Indicates the TX FIFO is empty and can receive additional bytes.

LOOPBACK Enable a loopback of RI DATA from the RI Connector

RI UART Data (0x05)

TABLE RIP 70

| RI (low speed) UART Data (0x05) | | | | | | | | |
|---|---|---|---|---|---|---|---|---|
| | Bit Number | | | | | | | |
| | 7 | 6 | 5 | 4 | 3 | 2 | 1 | 0 |
| Read | | | | RI UART RX FIFO | | | | |
| Write | | | | RI UART TX FIFO | | | | |

This address should only be read when the RxRdy bit of the RI UART CSR is set (1) indicating there is data in the FIFO. This address should only be written when the TxFull bit of the RI UART CSR is cleared (0) indicating there is room in the Tx FIFO.

Application FIFO CSR (0x06)

TABLE RIP 71

| Application FIFO CSR (0x06) | | | | | | | | |
|---|---|---|---|---|---|---|---|---|
| | Bit Number | | | | | | | |
| | 7 | 6 | 5 | 4 | 3 | 2 | 1 | 0 |
| Read | TxIdle | RxIdle | | | TxEmty | TxFull | RxRdy | TxIrqEn | RxIrqEn |
| Write | FlushTx | FlushRx | | | | | | TxIrqEn | RxIrqEn |

RxIrqEn Enable interrupt on RX Ready

TxIrqEn Enable interrupt on TX Empty

RxRdy Indicates there is RX data available

TxFull Indicates the TX FIFO is full, any additional bytes written to the FIFO will be lost TxEmpty Indicates the TX FIFO is empty and can receive additional bytes.

FlushTx Forces the App Tx State Machine to an Idle state as soon as possible

FlushRx Forces the App Rx State Machine to an Idle state as soon as possible

Flush Tx and FlushRx cause their appropriate state machines to go to an Idle state. This will be done after a packet is transmitted or if a packet transmission is not in process, in the case of TX or after a packet is received, in the case of RX. After the Idle state is achieved the Flush control may be removed.

Application FIFO (0x07)

TABLE RIP-72

| Application FIFO (0x08) | | | | | | | | |
|---|---|---|---|---|---|---|---|---|
| | Bit Number | | | | | | | |
| | 7 | 6 | 5 | 4 | 3 | 2 | 1 | 0 |
| Read | | | | RX FIFO | | | | |
| Write | | | | TX FIFO | | | | |

Used to access the Application RX and TX FIFO
Application TxLength (0x08)

TABLE RIP-73

| Application Packet Length (0x08) | | | | | | | |
|---|---|---|---|---|---|---|---|
| Bit Number | | | | | | | |
| 7 | 6 | 5 | 4 | 3 | 2 | 1 | 0 |
| Write | | | Application TX Packet Length | | | | |
| Read | | | Application RX Packet Length | | | | |

To allow the FPGA to use frames more efficiently, the MCU will write the length of the Application packet to this address, and then proceed to write the indicated number of bytes into the Application FIFO. This allows the FPGA to send the entire packet in one frame rather than as multiple fragments. For a received packet the value will reflect the number of bytes to be read for the received packet. Note: New receive packets will be inhibited until the Application Receive FIFO is emptied.
USB Bulk CSR (0x09)

TABLE RIP-74

| USB Bulk CSR (0x09) | | | | | | | |
|---|---|---|---|---|---|---|---|
| Bit Number | | | | | | | |
| 7 | 6 | 5 | 4 | 3 | 2 | 1 | 0 |
| Read | 0 | OutEmpty | InEmpty | 0 | OUT_FIFO_ADDR | | IN_FIFO_ADDR | |
| Write | | OutEnable | InEnable | | OUT_FIFO_ADDR | | IN_FIFO_ADDR | |

IN_FIFO_ADDR MCU endpoint FIFO address for USB Bulk IN data (to host from appliance)

OUT_FIFO_ADDR MCU endpoint FIFO address for USB Bulk OUT data (from host to appliance)

OutEnable When set (1), allows the FPGA to receive USB Bulk data from host. Disable will cause destructive Flush InEnable When set (1), allows the FPGA to send USB Bulk data to host. Disable will cause destructive Flush InEmpty Indicates there is no data in the FPGA's USB Bulk IN FIFO to send to host OutEmpty Indicates there is data in the FPGA's USB Bulk OUT FIFO from host remaining to send to appliance MCU Bank Address (0x0D)

TABLE RIP-75

| MCU Bank Address (0x0D) | | | | | | | |
|---|---|---|---|---|---|---|---|
| Bit Number | | | | | | | |
| 7 | 6 | 5 | 4 | 3 | 2 | 1 | 0 |
| Read/Write | Unused (0000b) | | | | Bank Address | | | |

This register controls the FLASH address A14:A17 for external data access to the MCU address range 0x4000 through 0x7FFF. For all external code access, the FPGA forces FLASH address A16:A17 to 0 making all code read from FLASH physical memory address range 0x00000 through 0x0FFFF.

MCU EA CR (0x0E)

TABLE RIP-76

| MCU EA CR (0x0E) | | | | | | | |
|---|---|---|---|---|---|---|---|
| Bit Number | | | | | | | |
| 7 | 6 | 5 | 4 | 3 | 2 | 1 | 0 |
| Read/Write | Unused (0000000b) | | | | | | MCU_EA |

This register controls the MCU's EA (External Access) pin. When the MCU's EA pin is HIGH (1), then all instructions are fetched from the external memory space. When the MCU's EA pin is LOW (0), then instructions in lower 8K (or 16K depending on MCU) will be fetched from the internal RAM/CODE space. Regardless of the MCU's EA pin, all instructions in the top 56K (or 48K) are fetched from external memory space.
Watchdog Timer (0x0F)

This eight bit wide register is written with a preset value for the watchdog timer. The value is reflective of approximately 6.7 mS per bit. If the counter is allowed to decrement to zero a system reset will be asserted for 6.7 mS at the transition from Count1 to Count0. Writing a 1 to the register will result in a 6.7 mS delay before timeout. Writing a zero to the register will disable the WDT.
Scratch (0x1E)
Eight Bit Read/Write Register
Version (0x1F)

TABLE RIP-77

| Version Register (0x1F) | | | | | | | |
|---|---|---|---|---|---|---|---|
| Bit Number | | | | | | | |
| 7 | 6 | 5 | 4 | 3 | 2 | 1 | 0 |
| Read/Write | Fallback | | | Version | | | | |

The fallback bit indicates that the FPGA image is minimized to implement only the RI Uart, Watchdog, FLASH Mapping and EA functions.
RIP Hardware Software Interaction This section will document typical interactions between the RIP's MCU firmware and the FPGA.
  1. Configuring data link
  2. Receiving RI (low speed) Application packets
  3. Transmitting RI (low speed) Application packets
  4. Receiving HI (high speed) Application packets
  5. Transmitting HI (high speed) Application packets
  6. Configure USB Bulk data transfers
Data Link Configuration One interaction between the MCU and the FPGA is the configuration of the data link. By default, the FPGA starts in RI mode. After receiving RI packets to negotiate HI mode, it is the responsibility of the MCU to configure the FPGA for HI mode. After queuing the ACK for the speed change, the MCU should take care to ensure the FPGA's RI transmit buffers are emptied before configuring the FPGA for HI mode. The FPGA RI UART CSR register's TxEmpty bit is used to verify the ACK packet has been transmitted. Once the TxEmpty bit is set, the MCU should set the FPGA HS Datalink CSR1 register's MODE field to the appropriate value.

RI Receive Packet

When the data link is in RI mode, the MCU uses the FPGA RI UART CSR and RI UART Data registers to control receiving messages. The MCU can use the RI UART CSR register's RxIrqEn field to configure the FPGA to provide an interrupt when received data is ready. When/if the MCU detects the interrupt, the MCU will examine the RxRdy bit of the RI UART CSR register, and if data is available, the data will be read from the RI UART Data register.

This is the same general process used in existing RIPs. The primary difference is existing RIPs use the MCU's integrated UART and internal data registers rather than using data registers in the external data space.

RI Transmit Packet

When the data link is in RI mode, the MCU uses the FPGA RI UART CSR and RI UART Data registers to control transmitting messages. The MCU can use the RI UART CSR register's TxIrqEn field to configure the FPGA to provide an interrupt when the TX FIFO is empty.

When the MCU has a packet to transmit, the MCU will examine the TxFull bit of the RI UART CSR register, to see if data can be placed in the TX FIFO. If the TxFull bit is clear (0), then the MCU will place data in the TX FIFO by writing to the RI UART Data register, and will continue to place data into the TX FIFO until the TxFull bit is set (1), or there is no more data.

This is the same general process used in existing RIPs. The primary differences are that the existing RIPs use the MCU's integrated UART and internal data registers rather than using data registers in the external data space, and the existing RIPs only have a single byte buffer rather than a FIFO.

HI Receive Packet

When the data link is in HI mode, the MCU uses the FPGA Application FIFO CSR and Application FIFO registers to control receiving messages. The MCU can use the Application FIFO CSR register's RxIrqEn field to configure the FPGA to provide an interrupt when received data is ready. When/if the MCU detects the interrupt, the MCU will examine the RxRdy bit of the Application FIFO CSR register, and if data is available, the data will be read from the Application FIFO register.

This is the same general process used for receiving data in RI mode.

HI Transmit Packet

When the data link is in HI mode, the MCU uses the FPGA Application FIFO CSR, Application FIFO, and Application TxLength registers to control transmitting messages. The MCU can use the Application FIFO CSR register's TxIrqEn field to configure the FPGA to provide an interrupt when the TX FIFO is empty.

When the MCU has a packet to transmit, the MCU will examine the TxFull bit of the Application FIFO CSR register, to see if data can be placed in the TX FIFO. If the TxFull bit is clear (0), then the MCU will write the length of the packet to the Application TxLength register. Then, the MCU will place data in the TX FIFO by writing to the Application FIFO register, and will continue to place data into the TX FIFO until the TxFull bit is set (1), or there is no more data.

This is the same general process used in transmitting data in RI mode, except the packet length should first be written to the Application TxLength register. Writing the Application TxLength allows the FPGA to ensure the Application data is not fragmented between multiple frames.

USB Bulk Data Transfers

Initial Configuration

To facilitate automatic USB Bulk Transfers with the Cypress MCU's internal USB endpoint FIFO buffers, the MCU should configure the FPGA USB Bulk CSR register. This register configures the MCU endpoint FIFO addresses associated with USB IN and USB OUT transfers.

USB Bulk Transmit

When the MCU determines USB Bulk data should be transmitted to the Appliance, the MCU transmits an Application packet to the Appliance indicating the number of bytes that will be transmitted. When the MCU receives the an Application packet acknowledging the request, the MCU configures the FPGA for transmitting by writing the length of the transfer to the USB Bulk TxLength MSB and USB Bulk TxLength LSB registers (NOTE: USB Bulk TxLength MSB should be written first).

Datalink Operation

Figure 10:
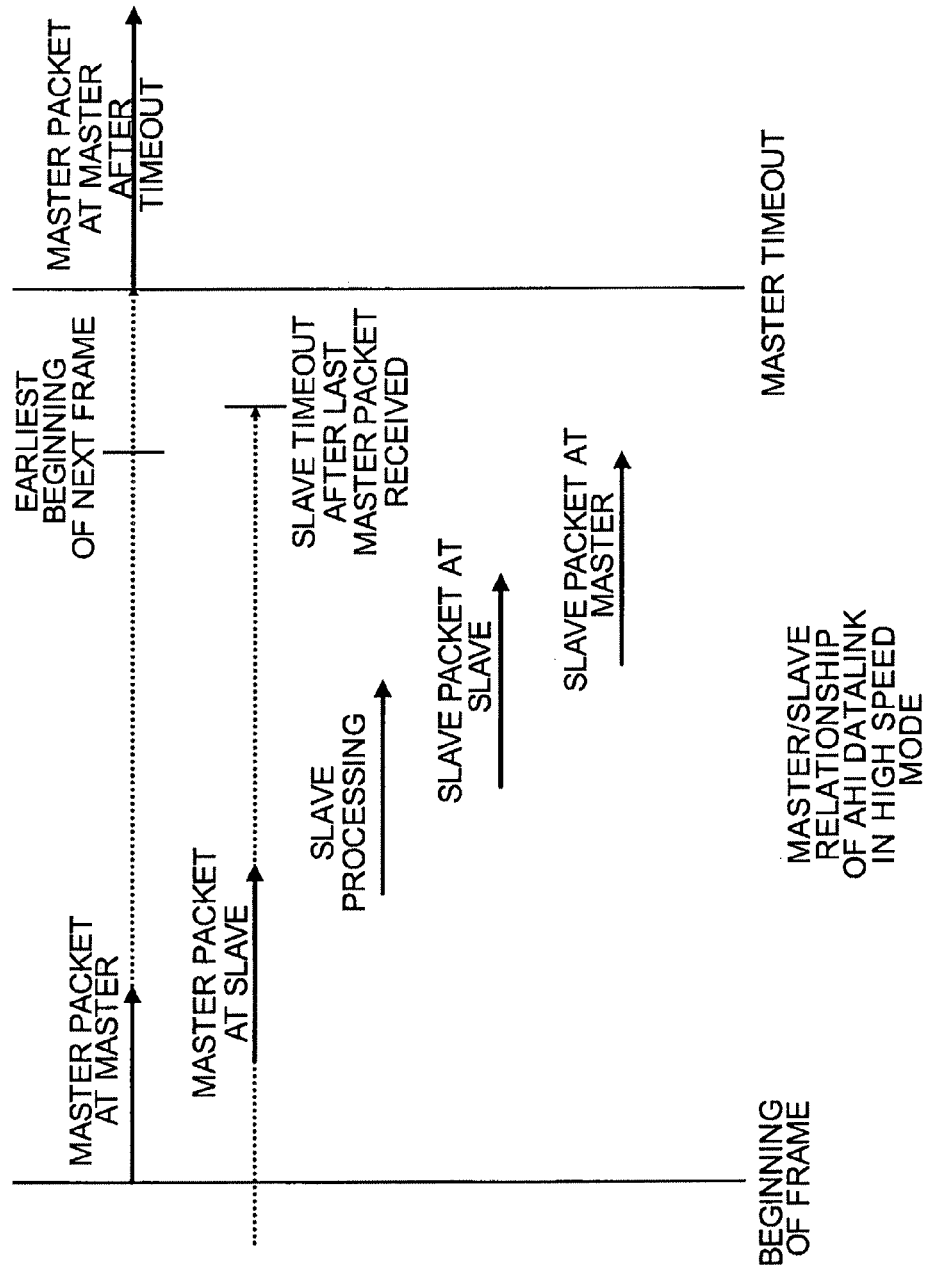
FIG. 10 depicts relative timing in a RIP.

The operation of the datalink interface is based on a master/slave relationship where the appliance (master) transmits a packet and the rip (slave) replies to a packet. The relative timing of this relationship is as depicted in FIG. 10.

Normal Operation

A frame is defined as a pair of variable length packets, one in each direction, being sent by the master (appliance) and slave (RIP). The slave will only respond to a packet received from the master. The master times out if no response is received from a slave. The slave times out based on an incomplete packet. The master will always transmit a minimum number of frames per second. A slave will always respond to a received packet, whether it has data to transmit or not.

Startup Operation

Startup operation is initiated from an HI link inactive state. The Slave will receive one valid complete packet prior to responding to the Master. The Master will retry a packet transfer on a regular basis until a valid connection is obtained as indicated by three successive ACKed packets. Start up will be entered from "RI compatibility mode" when negotiating up to HI Mode", or after link failures.

Failures

Incomplete packets will be discarded and NACKed

Errored packets will be discarded and NACKed

Nacked packets will cause the link will be declared inactive and will revert to "Startup".

No Response packets will cause the link will be declared inactive and will revert to "Startup".

Any "No Response" Packet will cause the link to be "NOT_LINK_ACTIVE". After eight successful packet exchanges the link will be declared "LINK_ACTIVE". When the link is "NOT_LINK_ACTIVE" only "NOP" packets will be exchanged. After the link is declared "LINK_ACTIVE" payload packets will be allowed.

High Speed RIP FPGA Logic

Figure 11:
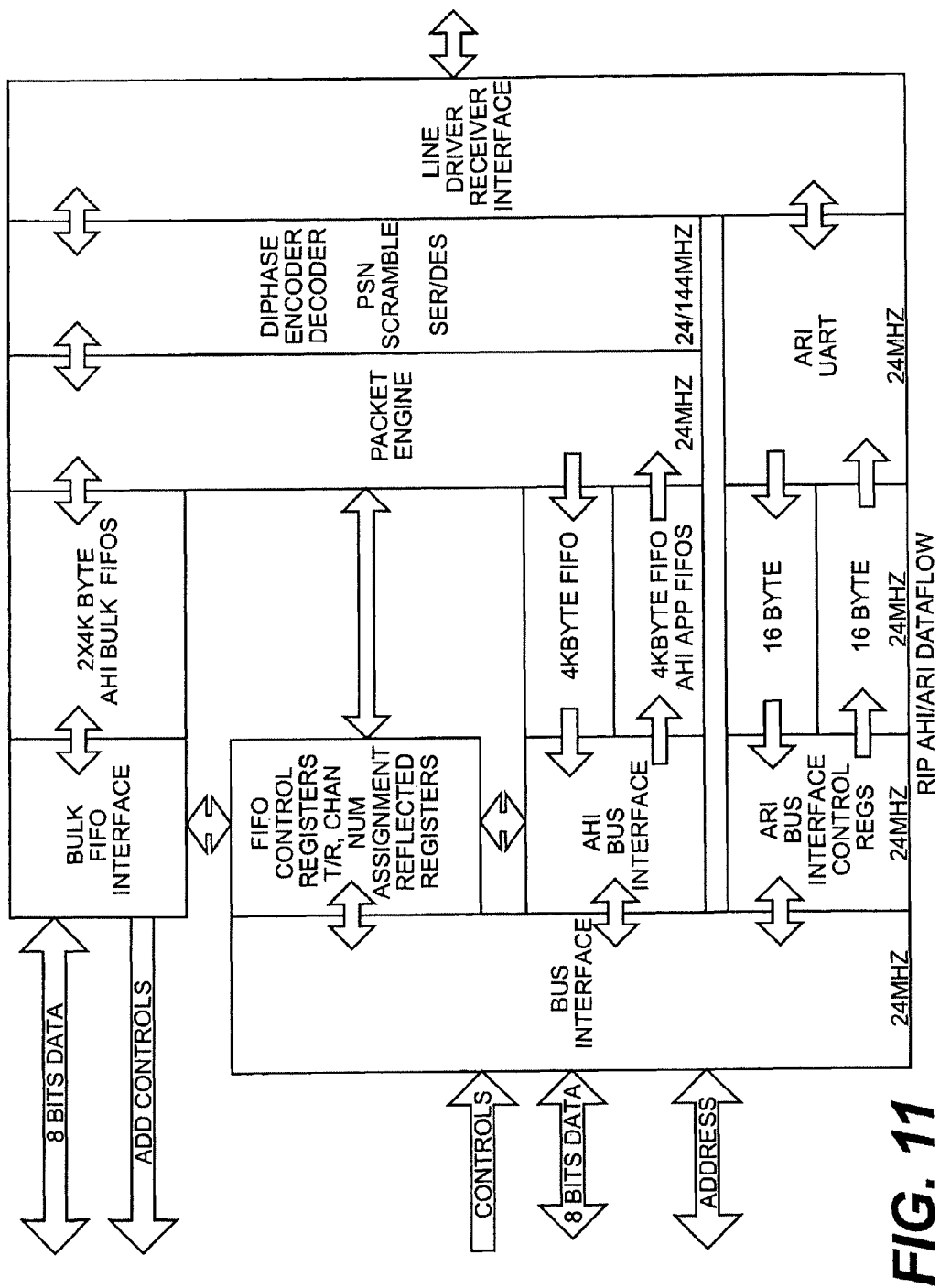
FIG. 11 depicts the dataflow paths through an FPGA in a RIP.
Figure 12:
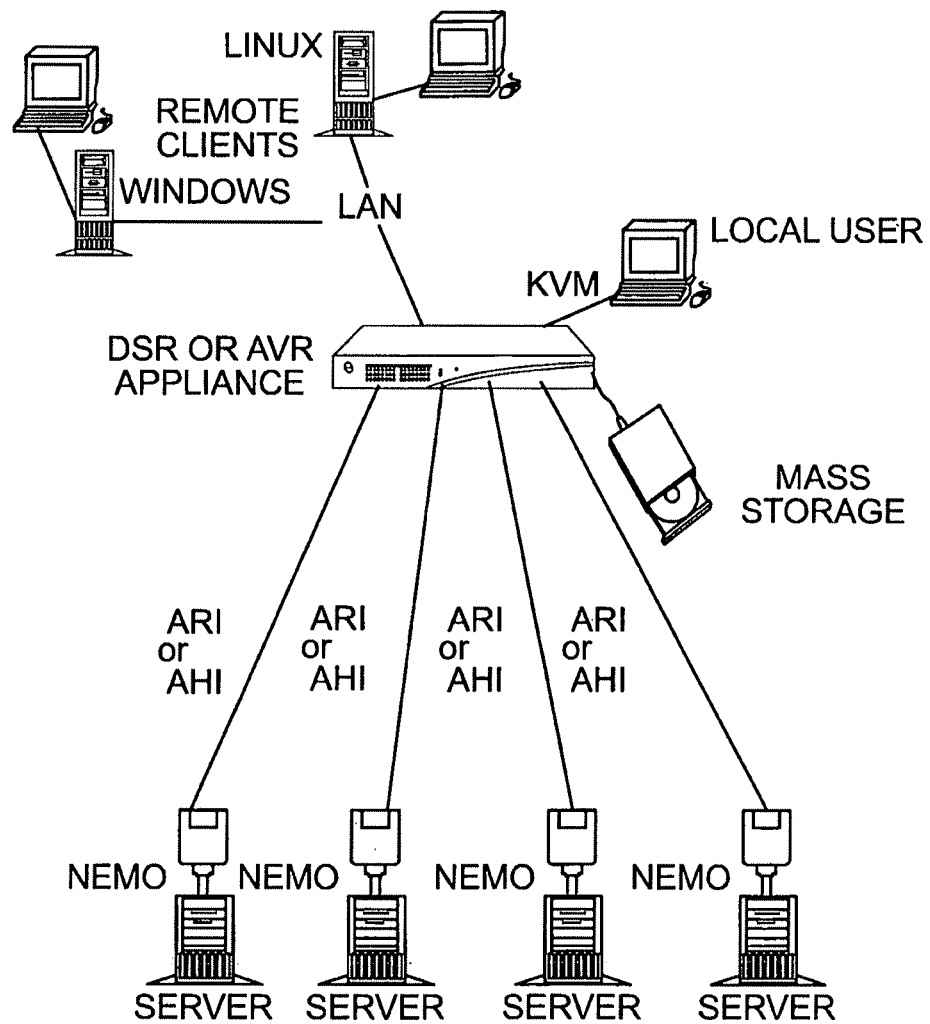
FIG. 12 depicts a configuration according to embodiments of the present invention.

FIG. 11 depicts the dataflow paths through the FPGA in presently preferred exemplary embodiments. The Bulk FIFO Interface provides an independent path for USB bulk data transfers. The HI Bus Interface path provides for processor to processor communications. The RI Bus Interface path provides the default RI Uart interface. A fallback FPGA image may be kept in the FLASH Memory for a default RI mode. This image provides all functionality of the full up image, excluding the HI functions.

Message Sequence Diagrams

Figure 5B:
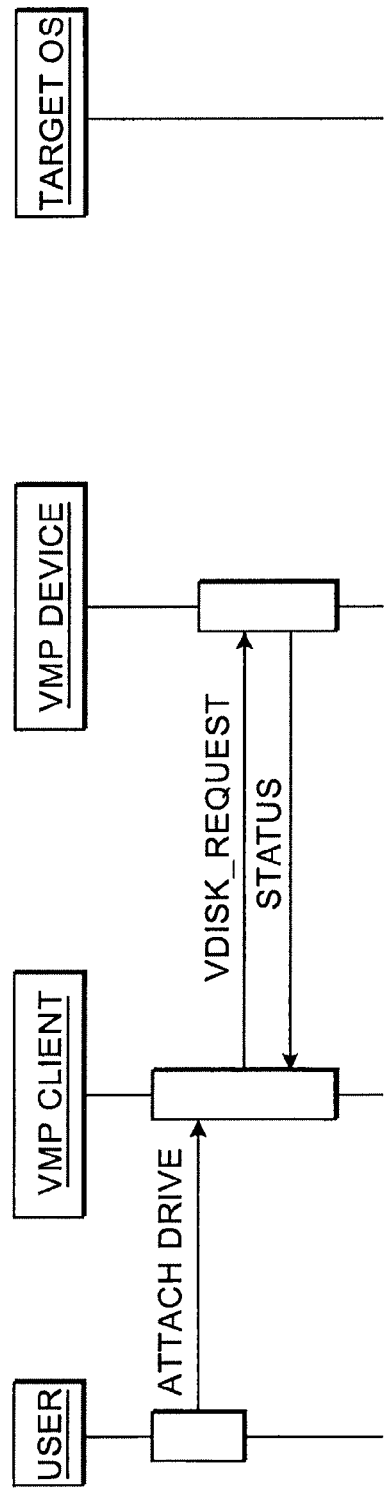
Figure 5C:
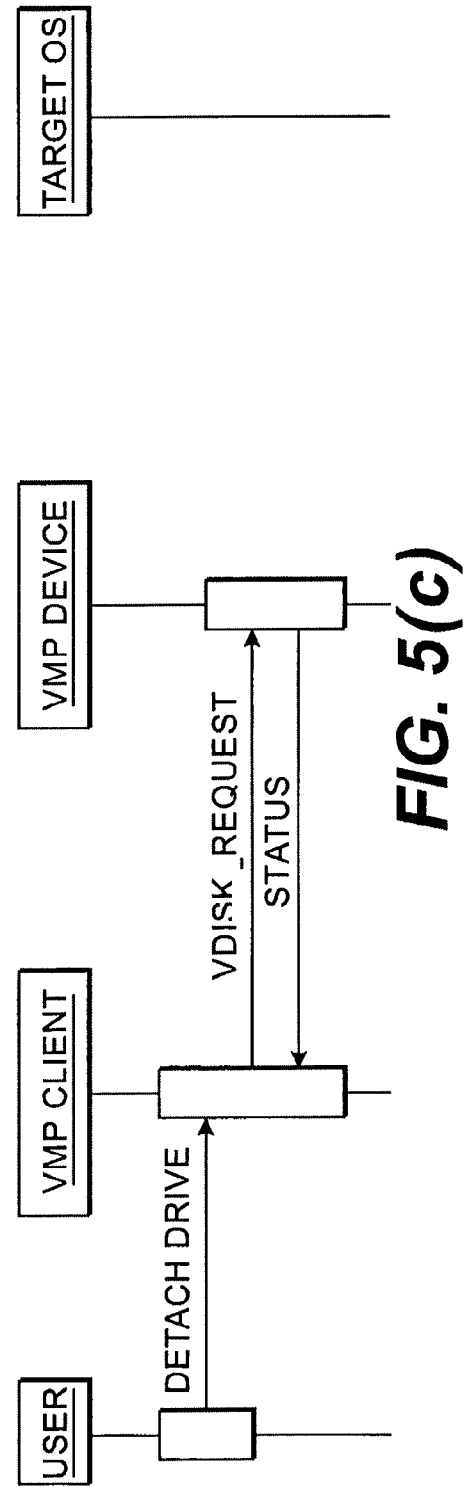
Figure 5D:
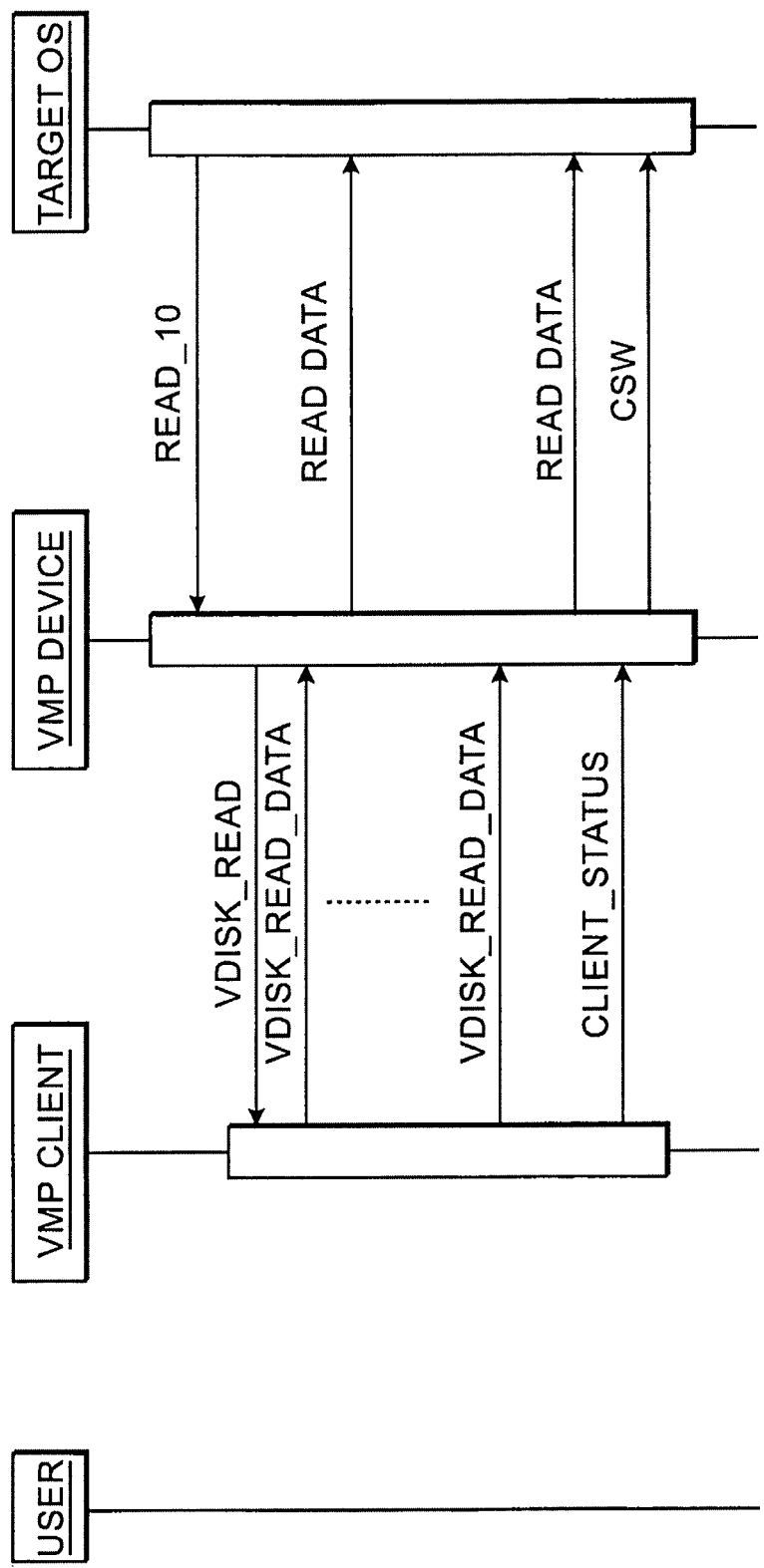
Figure 5E:
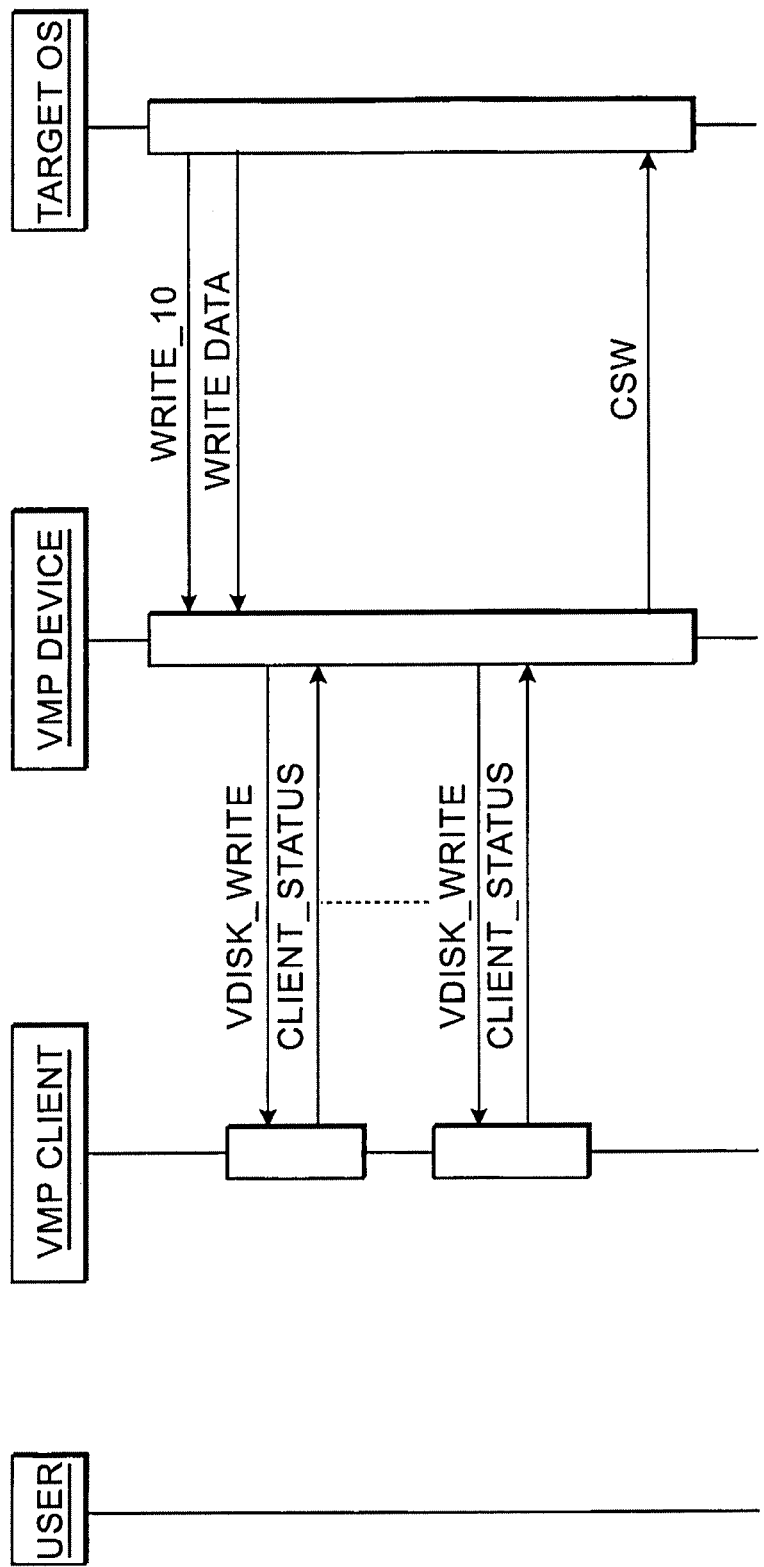

FIGS. 5(a)-5(e) are exemplary message sequence diagrams. FIG. 5(a) shows an exemplary connection sequence. FIG. 5(b) shows an exemplary virtual media (virtual disk) mapping sequence—a vDisk Mapping Sequence. FIG. 5(c) shows an exemplary virtual media (virtual disk) unmapping sequence—a vDisk Unmapping Sequence. FIG. 5(d) shows an exemplary virtual media (virtual disk) read sequence—a vDisk Read Sequence. FIG. 5(e) shows an exemplary virtual media (virtual disk) write sequence—a vDisk Write Sequence. Those skilled in the art will realize and understand, upon reading this description, that different and/or other message sequences may be used.

Graphical User Interface

Figure 6A:
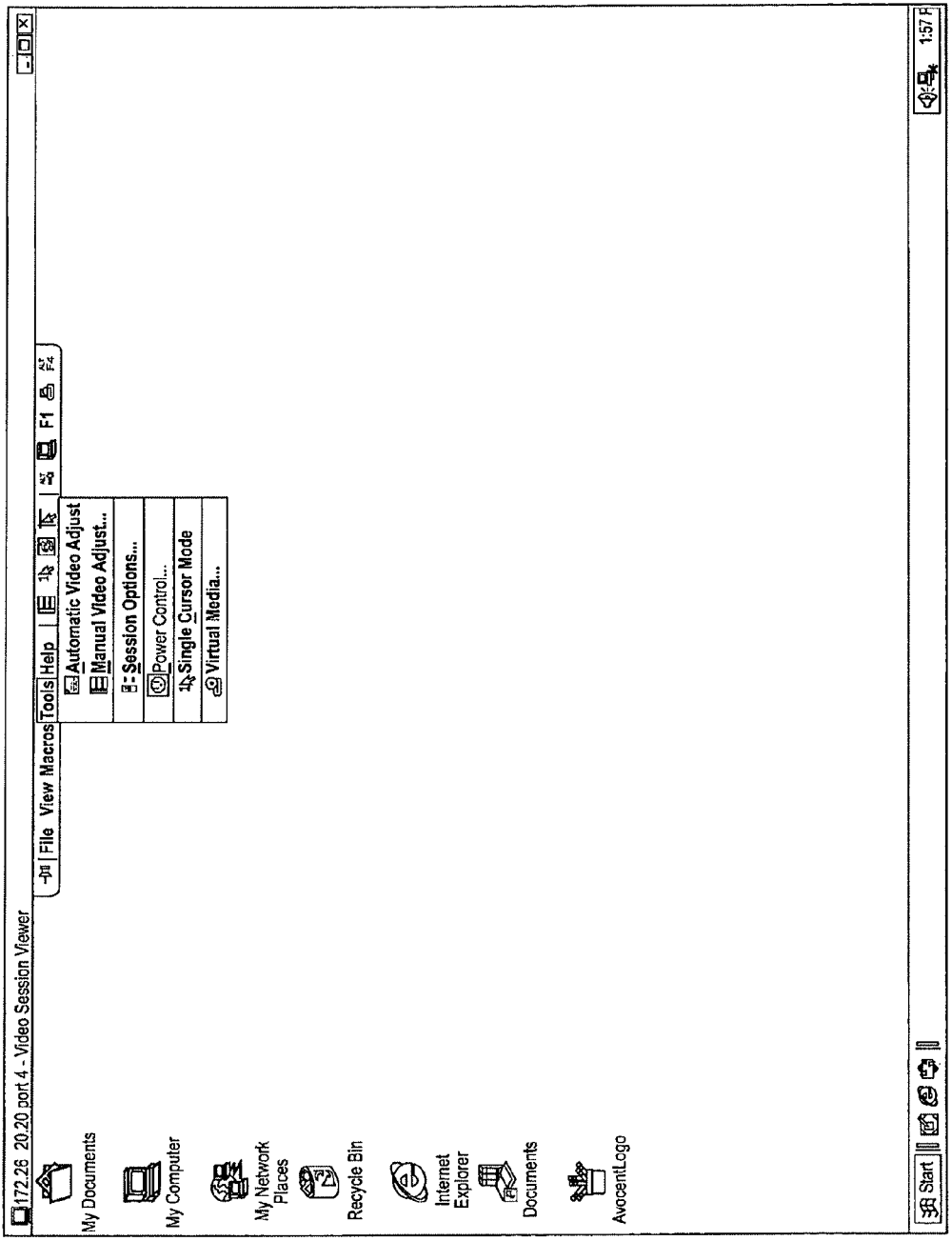
FIGS. 6(a)-6(v) are views of information displayed on a user's display when using a graphical user interface (GUI)

We now describe an exemplary graphical user interface (GUI) for a virtual media client. As shown, for example, in FIG. 1, the virtual media GUI 116 preferably resides on the client 102. The GUI 116—the graphical user interface for virtual media—is preferably launched/accessed or invoked from the "Tools" menu of the dropdown menu bar/toolbar as shown, for example, in FIG. 6(a). Those skilled in the are will realize and understand, upon reading this description, that the access point and invocation method may be different for each particular product or application.

As used herein, with reference to interaction with the GUI, the term "click" refers generally to the process of selection. So, those skilled in the art will understand that, e.g., when the description states that a user "clicks on" an item in the GUI, this generally means that the user selects the item.

Management software in use, and/or the appliance should determine who may initiate and access a Virtual Media session. In some embodiments, if a user launches a Virtual Media session for a particular target device and a Virtual Media session for that device is already running on the client's workstation, then the existing session should be brought to the foreground and a new session should not be started.

Figure 6B:
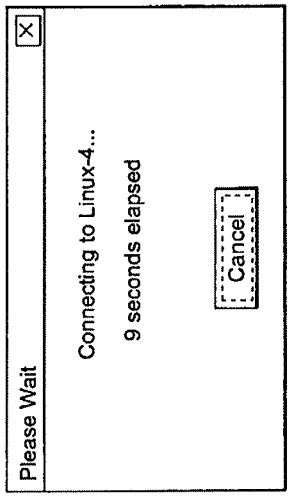

The Virtual Media dialog box is the central focus of the virtual media GUI. The Virtual Media menu item in the Video Viewer brings up a Virtual Media dialog box. Upon launching, the Virtual Media dialog box initiates communication with the appropriate authentication/authorization server and, if necessary, performs a login operation using the same credentials, or credential mechanism, such as a certificate, as was used to login to the KVM/VM appliance or device for its KVM session. While login is underway a progress dialog which displays the name of the virtual media target device will be displayed, as shown, for example, in FIG. 6(b). While the progress dialog is displayed, if the user presses the Cancel button, then the virtual media session will be cancelled and the Virtual Media dialog box will not be displayed.

Figure 6C:
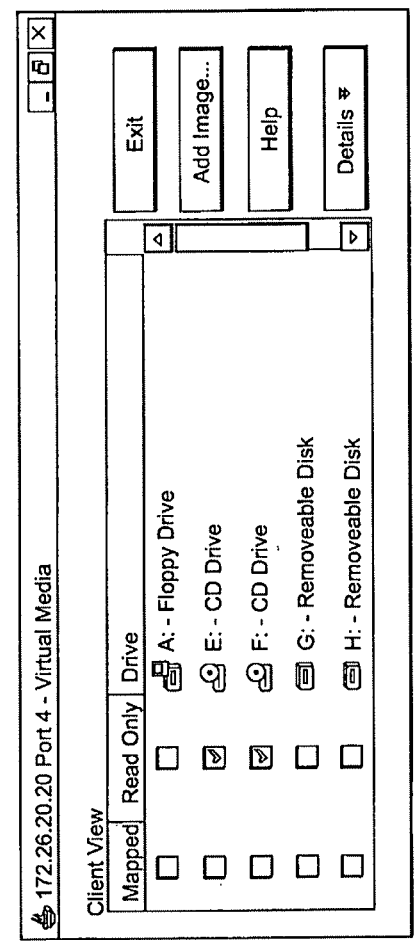

An exemplary Virtual Media Mapping dialog box is shown in FIG. 6(c). Although the Virtual Media GUI takes the form of a dialog box, it is preferably a standalone program. As a standalone program, the dialog box will have its own button on the Windows taskbar (or equivalent for other operating systems).

The Virtual Media dialog displays some or all the physical drives on the client workstation that can be mapped as virtual drives on the target (in some embodiments, hard drives cannot be mapped as virtual drives and will not be displayed). The dialog continuously monitors the operating system to determine which physical drives are present on the client workstation. The dialog also allows a user to map ISO and floppy image files as virtual drives through the use of the "Add Image" button. (An ISO image refers here to a disk image of an ISO file system, generally an ISO 9660 file system.) Each mapped drive can be limited to read only access. CD/DVD drives and ISO images are always read only. In the example, the title on the Virtual Media dialog box is dependent on the system in which it is in use. In general, the title should try to convey which appliance and for which target device the virtual media session is being conducted. Closing the Virtual Media dialog box will close the virtual media session.

Mapping a Virtual Media Drive

Figure 6D:
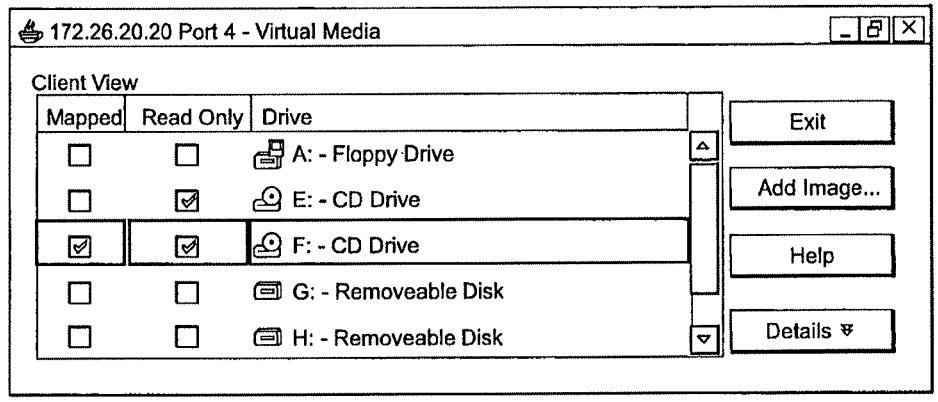

To map a virtual media drive, the user selects a drive to become a Virtual Media Drive by clicking on the Mapped check box for a particular drive, e.g., as shown, in FIG. 6(d), where a user has selected CD drive "F" to be mapped (since it is a CD drive, it is read only). While a drive is being mapped a wait cursor is displayed. In a presently preferred implementation, the timeout on the mapping has a default value of thirty seconds, but that value may be changed through configuration parameters. If a drive mapping fails, then one of the error notifications detailed in following sections will be displayed and the Mapped checkbox for that drive will be deselected (unchecked).

As noted, mapped drives may be limited to read-only capability by checking the Read Only checkbox for that mapped drive. CD/DVD Drives and ISO images are always read only which cannot be changed. Management software and/or the appliance may set the read-only limitation for those drives which are not physically limited to read only capabilities, such as a mass storage device. If the management software and/or appliance sets a drive to read-only, then its read only parameter in the mapped drives list may not be changed by the user. Note: Floppy image files and ISO image files may be added to the list of available drives by using drag-and-drop where the Client View table in the Virtual Media Mappings dialog will serve as a drag-and-drop target. (The type of operating system running on the client's workstation may limit Drag-and-drop capability and availability.) Once a floppy or ISO image file is listed as an available drive then it may be mapped as virtual media just like any other drive.

When a user selects the GUI option to map virtual media, the operations shown in FIG. 5(b) may take place.

Unmapping a Virtual Media Drive

Figure 6E:
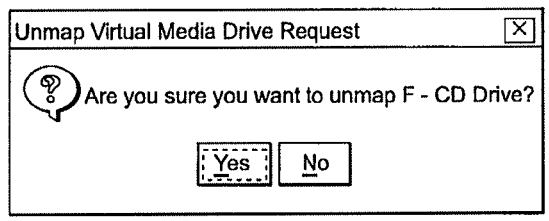
Figure 6F:
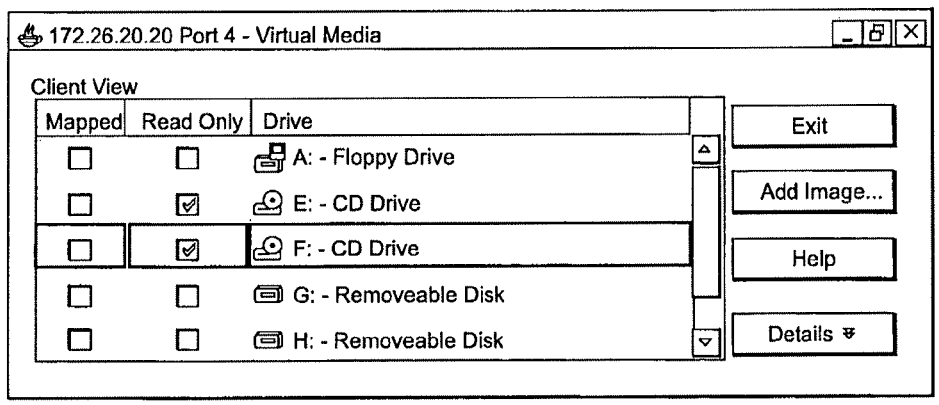

To unmap a Virtual Media Drive the user clicks again on the Mapped check box for a particular drive. Because some interaction may be going on with the drive, before it is unmapped the user is asked to confirm their action as shown, for example, in FIG. 6(e). It should be noted that anytime a drive is unmapped a disruption to the activities on the target device and the client may take place. Since there are many scenarios in which this might take place it was believed to be superfluous and repetitive to indicate in every instance a warning to the user that a disruption to operations may take place. If the user decides to unmap the drive (by pressing the Yes button in the confirmation message box), then that is reflected by the check box not being selected in the list of available drives as shown, for example, in FIG. 6(f).

When a user selects the GUI option to map virtual media, the operations shown in FIG. 5(c) may take place.

Mapping an ISO or Floppy Image as a Virtual Media Drive

Figure 6G:
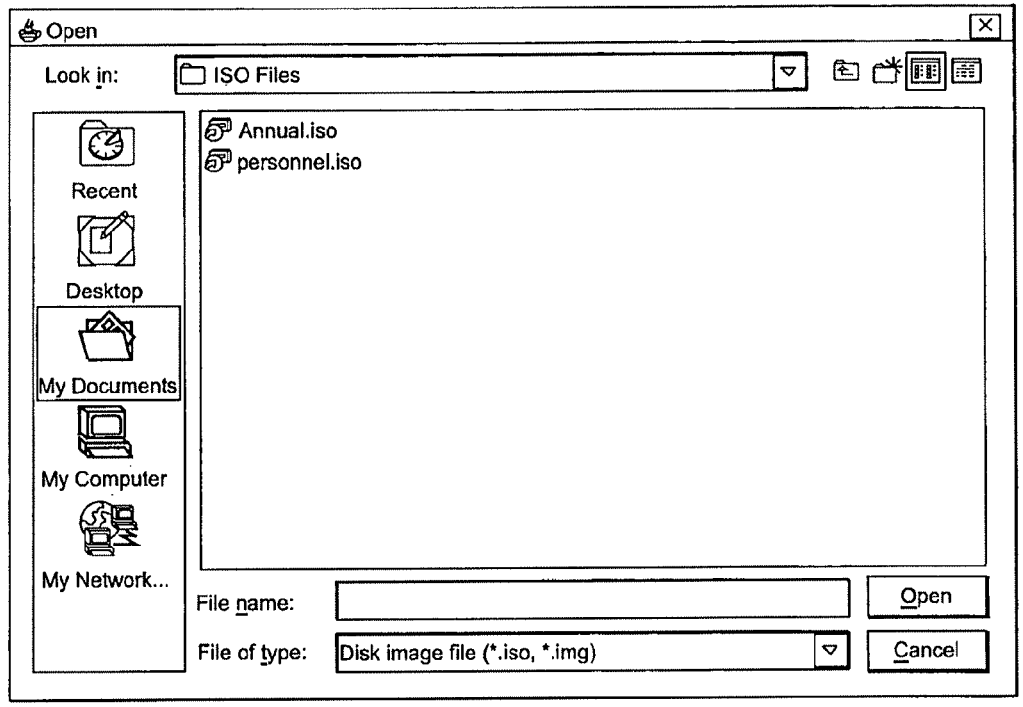
Figure 6H:
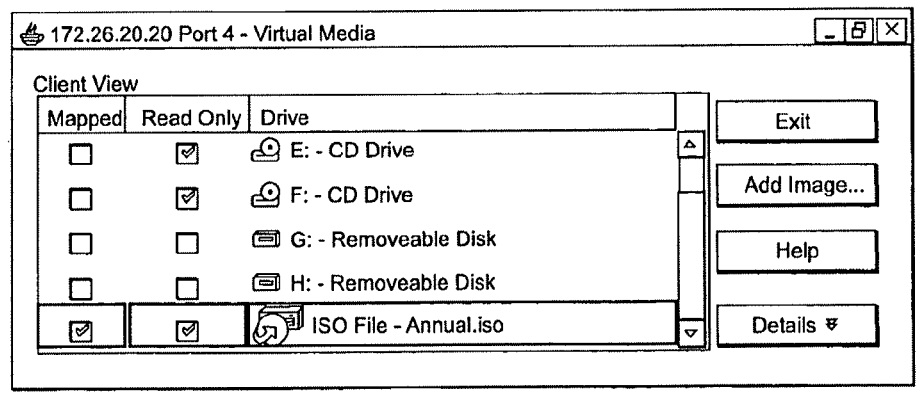

If the user wants to map an ISO or floppy image file then the first thing that needs to be done is to select the Add Image button in the Virtual Media Mapping dialog box. This will cause the common file dialog for the client workstation's operating system to appear with ISO and floppy image files displayed, as shown, for example, in FIG. 6(g). The user can select an ISO or floppy image file for availability in the Virtual Media Mappings dialog by selecting it in the Common File Dialog and then clicking on the Open button. The file that is selected then is checked to ensure its header indicates it is the proper type of file. If the file format is correct, the file appears in the Virtual Media Mapping dialog where the user can map it in the same manner as any other drive is mapped, e.g., as shown in FIG. 6(h).

Figure 6I:
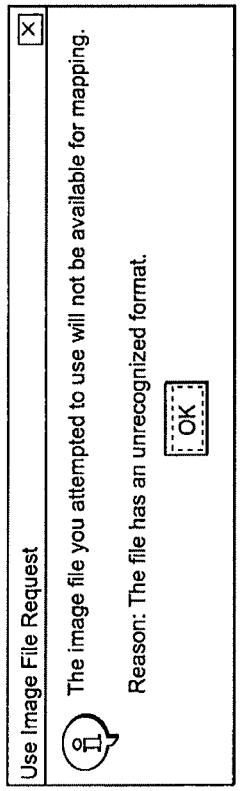

If the file format is not correct (as indicated by the file's header), then a warning will be issued, e.g., as shown in FIG. 6(i), and the file image will not be available for mapping.

Attempting to Map Too Many Drives

Figure 6J:
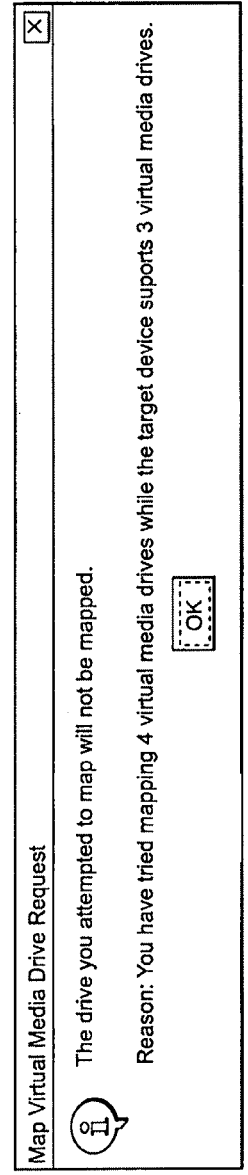
Figure 6K:
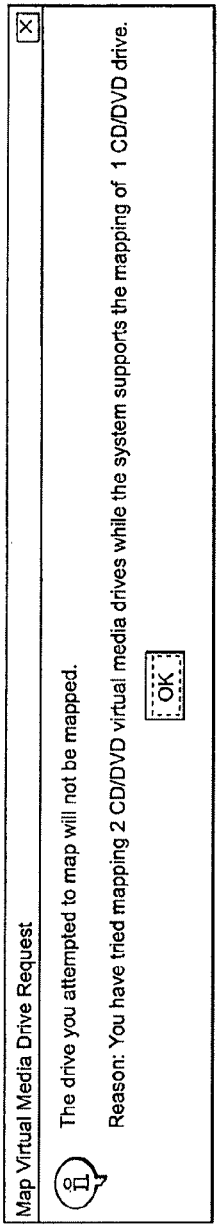

If a user tries to map too many virtual media drives, i.e., more than the target device supports, then a warning will be issued, e.g., as shown in FIG. 6(j). For example, for some implementations, the appliances only allow mapping of one CD/DVD drive and one mass storage drive at a time. Two CD drives cannot be mapped simultaneously, nor can two mass storage devices. If the user tries to map too many virtual media drives of a particular type then a warning will be issued, e.g., as shown in FIG. 6(k).

Details View

Figure 6L:
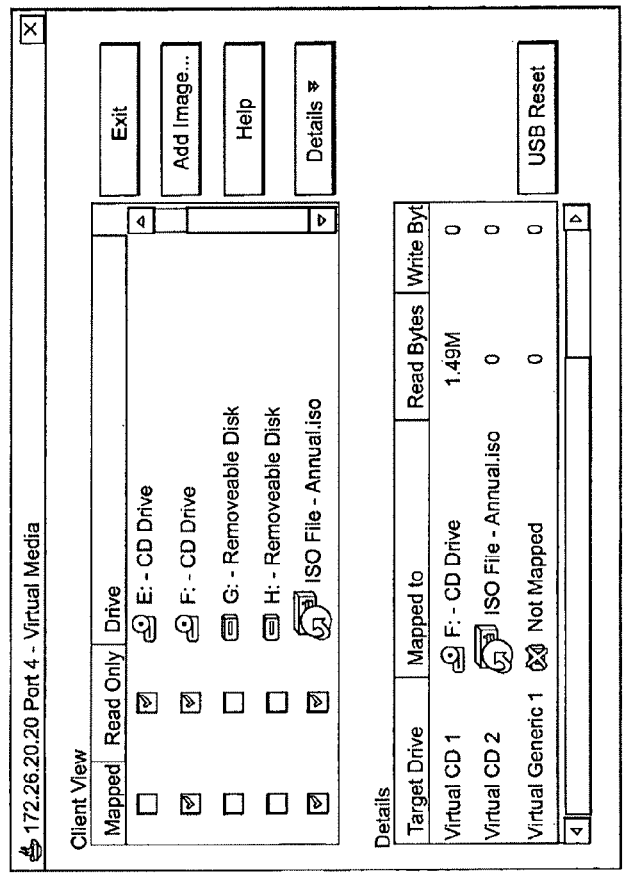

When selected, the Details button on the Virtual Media Mapping dialog causes the details view of the virtual mapping to be displayed. FIG. 6(l) shows an exemplary Virtual media dialog box with details view, according to embodiments of the present invention. The Details view shows how many virtual drives the target can map and where each of those virtual drives is mapped on the client. Note that the exemplary graphic shown in FIG. 6(l) indicates the presence of three virtual drives on the target device. The Details table may be scrolled to the right to show more information as shown, for example, in FIG. 6(m). Selecting (e.g., by clicking on) the Details button will cause the Virtual Media Mappings dialog to return to normal (non-detailed) view.

The Details view may provide the information indicated in the following table:

TABLE 78

Information in Virtual Media Dialog Details View

| Column | Information |
| --- | --- |
| Target Drive | The virtual drive on the target device |
| Mapped To | The drive on the client the virtual drive is mapped to. The number of bytes is continuously updated throughout the session. |
| Read Bytes | The number of bytes read from the client's mapped drive and sent to the target device. The number of bytes is continuously updated throughout the session. |
| Write Bytes | The number of bytes received from the target device and written to the client's mapped drive |
| Duration | The length of time the drive has been mapped in Hours:Minute:Seconds format. The time is continuously updated throughout the session. |

Figure 6M:
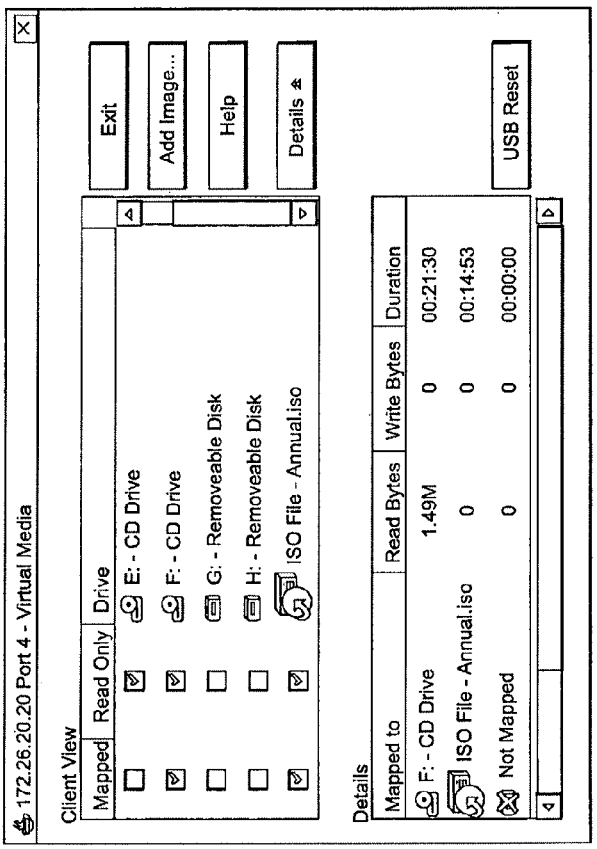
Figure 6N:
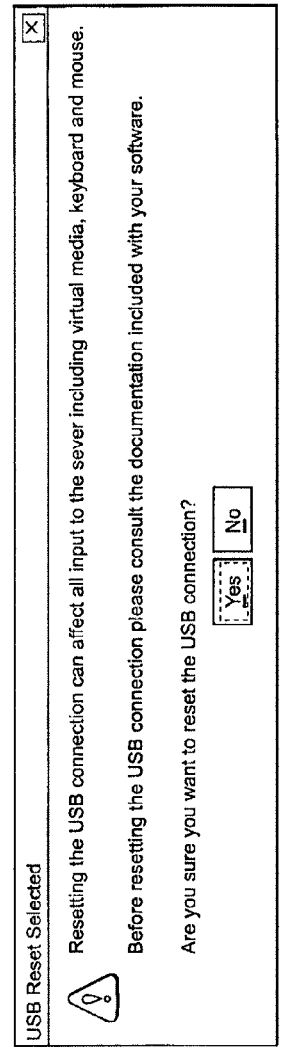

A USB Reset button may be available in the Details View as shown, e.g., in FIGS. 6(l)-6(m). The button may be unavailable and grayed out if the reset function is not available in a particular implementation. If the USB Reset button is available, then upon the button being selected by the user, a warning, e.g., as shown in FIG. 6(n) will be displayed. If the user selects the "Yes" option then the appliance will be instructed to perform the USB reset operation.

Closing the Virtual Media Dialog Box

Figure 6O:
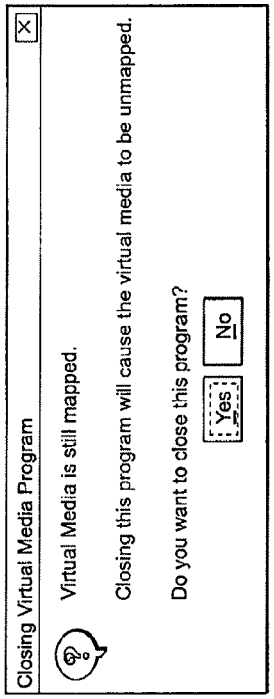

Closing the Virtual Media dialog box will result in the unmapping of all mapped drives for the virtual media session. If the user attempts to close the Virtual Media dialog box using one of the dialog box's closure mechanisms (e.g., System Menu in upper left corner, "X" Close Box in upper right corner, Exit button on the dialog or Alt-F4 key combination) and one or more drives have been mapped, then the user will be asked to confirm the closure of the dialog box as shown, e.g., in FIG. 6(o).

Virtual Media Session after KVM Session Closes.

Continuing the Virtual Media Session

How a virtual media session reacts to the closure of its associated KVM session is dependent on configuration settings determined, e.g., by management software in use and/or the appliance. These settings may indicate the following:

1. The closure of a KVM session will always close the associated virtual media session regardless of the reason for the closure.
2. The closure of a KVM session by the user will cause the virtual media session to close.
3. The closure of a KVM session by the administrator (disconnection) will cause the virtual media session to close.
4. The closure of a KVM session by the user will result in the user being prompted to determine if they want to continue the virtual media session.
5. The closure of a KVM session by the inactivity timeout mechanism will result in the virtual media session being terminated.
6. The closure of a KVM session by the inactivity timeout mechanism will result in the virtual media session being continued without prompting the user (if there was no activity it seems safe to assume the user may not be there to respond to a prompt on whether they want to continue the virtual media session).
7. The preemption of the KVM session by another user will cause the virtual media session to close.
8. That preemption of a KVM session will not be permitted if a virtual media session is in progress.
9. That preemption of a KVM session will result in the user being prompted to determine if they want to continue the virtual media session.

Unless the configuration settings from the management software and/or appliance indicate otherwise, the default behavior is preferably to prompt the user to continue the virtual media session regardless of the reason or mechanism of closure of the KVM session.

Figure 6P:
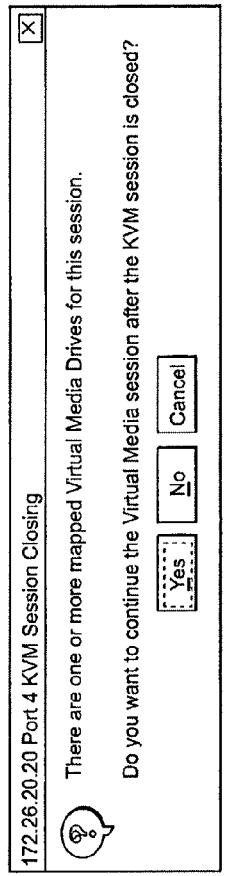

Regardless of how the KVM session is closed, if the configuration settings for that type of closure, or the default behavior, indicate that the user be given an option to continue the virtual media session, then the user will be notified that there are mapped drives and be given the option to continue with the Virtual Media Drive session(s) as shown, for example, in FIG. 6(p).

Blocking, Preemption and Disconnection

Certain conditions require operations outside the scope of what is described above. Conditions such as blocking, preemption and disconnection by an administrator are now addressed.

Blocking

When a user closes a KVM session but leaves the virtual media session running, as described above, then if another user connects to the same target device with a KVM session and then tries to start a virtual media session a blocking situation will occur. The second KVM session may not be able to start a virtual media session because the first virtual media session is still in progress and using the virtual media channel of the appliance for that target device. When this type of blocking situation occurs it will be up to management software in use and/or the appliance to determine whether the existing virtual media session may be preempted.

Preemption

Insufficient Privileges for Preemption

Figure 6Q:
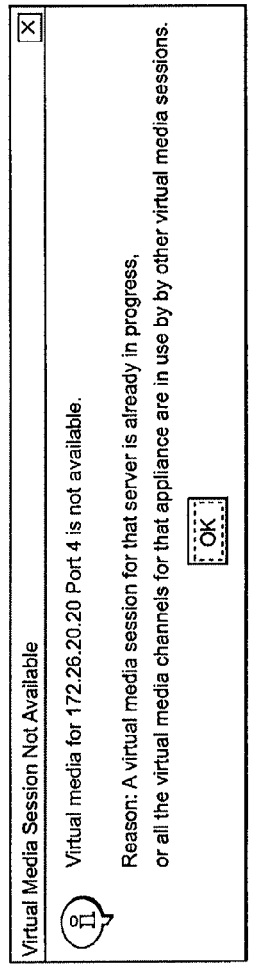

If the management software and/or appliance determine that the user attempting to start the virtual media session does not have sufficient privileges to preempt an existing virtual media session, then the GUI will be instructed to inform the user that the virtual media session cannot be started, e.g., using a notice as shown, for example, in FIG. 6(q).

Sufficient Privileges for Preemption

Figure 6R:
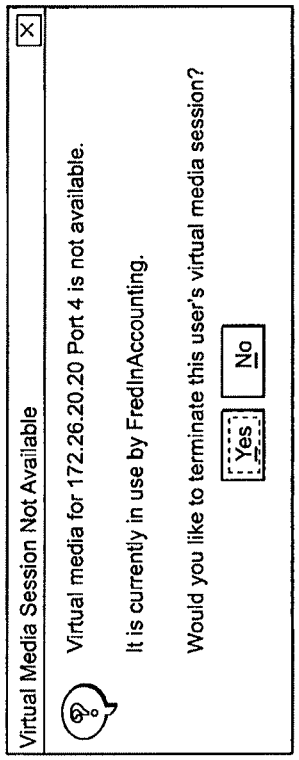

If the management software and/or appliance determine that the user attempting to start the virtual media session has sufficient privileges to preempt an existing virtual media session, then the GUI will be instructed to offer the option to preempt the existing virtual media session to the user attempting to start the virtual media session. The preemption notice may appear as shown, for example, in FIG. 6(r). Preemption means that all the virtual media drives mapped in the existing virtual media session will be unmapped. There are presently two types of preemption: User rejection not allowed, and user rejection allowed.

User Rejection of Preemption not Allowed

Figure 6S:
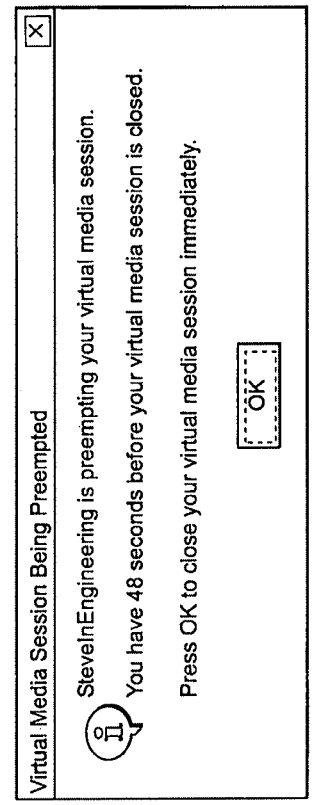

If user rejection is not allowed, as determined by the management software and/or appliance, then the user whose virtual media session is being preempted will be notified, e.g., by a message that looks like that in FIG. 6(s). The countdown in the second sentence of the notice will be continuously updated until it reaches zero or the user presses the OK button. When the message closes, the user's virtual media session will be preempted.

Figure 6T:
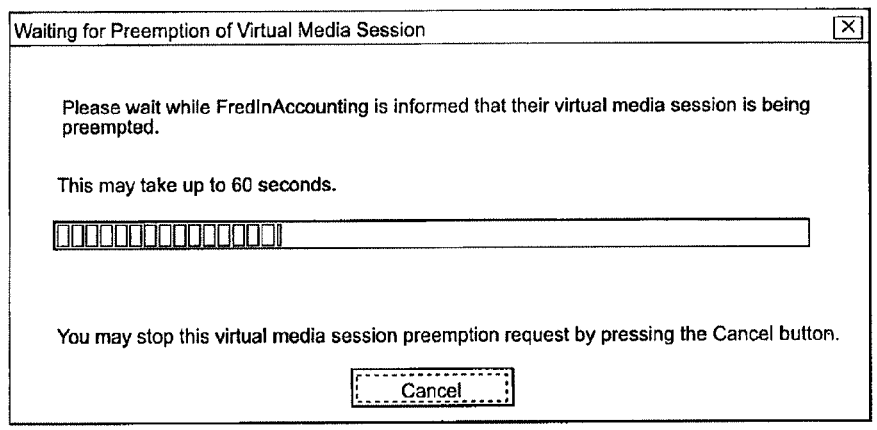

If the user whose virtual media session is being preempted does not have the right to reject the preemption request, then the user who is attempting to preempt the virtual media session will see a notice like that shown in FIG. 6(t), while they wait for the other user to respond to the preemption request.

User Rejection of Preemption Allowed

Figure 6U:
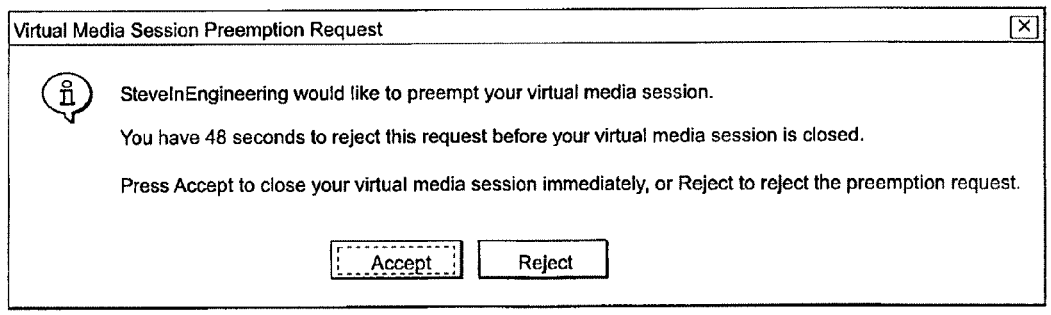

If user rejection is allowed, as determined by the management software and/or appliance, then the user whose virtual media session is being preempted will be notified by a message that looks like that shown in FIG. 6(u).

While most dialog boxes and user notification messages allow the X close box and escape key to perform the same operation as a "No" or "Cancel" button, when those buttons are available, or as an OK button if the OK button is there simply to act as an acknowledgement from the user, in this case the X close box and escape key will not have any functionality. That is because there is no natural mapping of the X close box or escape key to either the Accept button's functionality, which closes the user's virtual media session immediately, nor to the Reject button's functionality, which rejects the preempting user's request. If the client's operating system allows it, the X close box should not be shown on this message.

The countdown in the second sentence of the notice will be continuously updated until it reaches zero or the user presses the Accept button. If the user presses the Accept button, or if the countdown reaches zero and the message closes, then the user's virtual media session will be preempted.

Figure 6V:
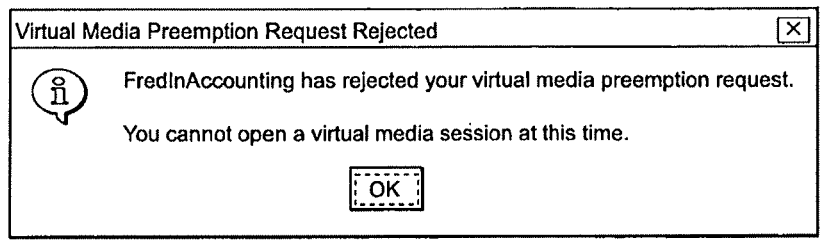

If the user presses the reject button, then the user's virtual media session will not be preempted, and the user who attempted to preempt the virtual media session will see a notice, e.g., like that shown in FIG. 6(v).

Figure 6W:
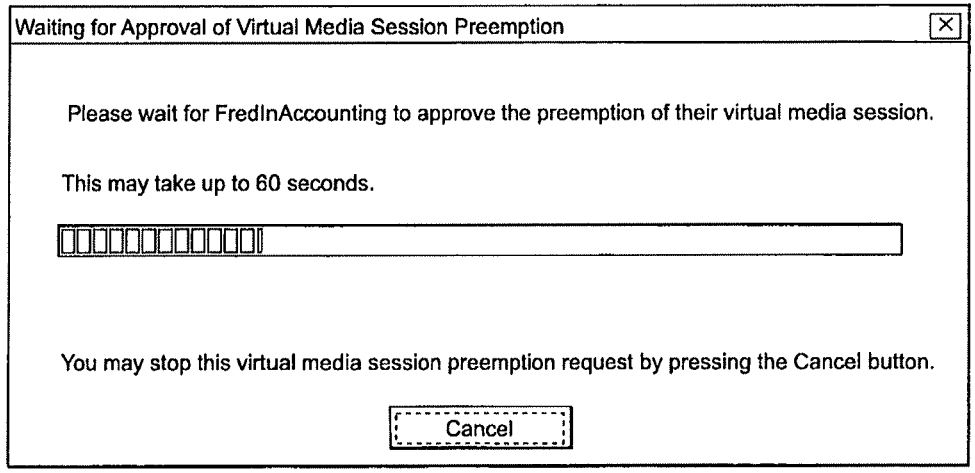

If the user whose virtual media session is being preempted does have the right to reject the preemption request, then the user who is attempting to preempt the virtual media session will see a notice like that shown in FIG. 6(w) while they wait for the other user to respond to the preemption request.

Cancellation of Preemption Attempt

Figure 6X:
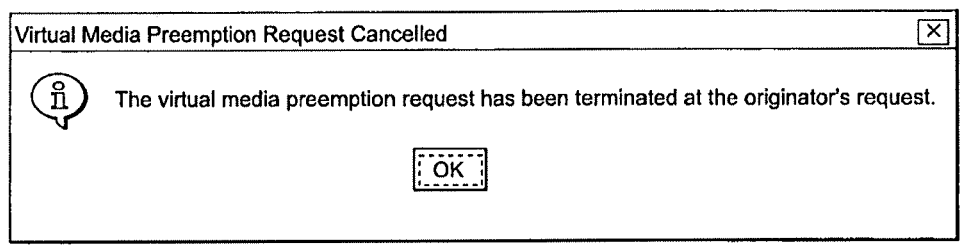

If the user who is attempting to preempt the virtual media session decides to cancel the preemption attempt, e.g., by clicking on the Cancel button, or the X close button on the dialog box, then the user whose virtual media session was being preempted will see a message, e.g., like that shown in FIG. 6(x), advising him that the virtual media preemption request has been terminated at the originator's request.

Disconnection

Figure 6Y:
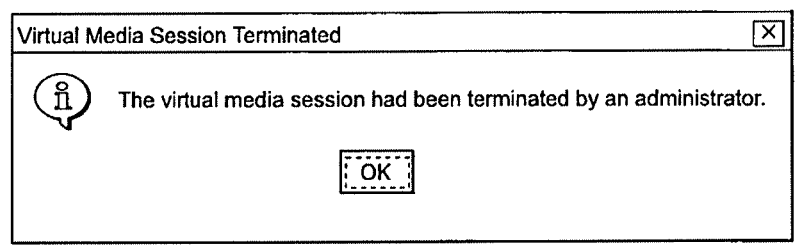

The management software in use, such as, e.g., Avocent's AVWorks or DSView, may allow an administrator to disconnect a user's virtual media session. If the management software allows it, then when an administrator disconnects a user's virtual media session, the virtual media GUI will display a message, e.g., like that shown in FIG. 6(y), advising the user that an administrator has terminated the virtual media session.

Applications/Uses

Uses of Remote Media

Users may use the remote media capability to either move files or data to and from a target device from either an appliance attached to the target device or using software to do this remotely over a network.

Many users have systems today that allow them to remotely manage files of both applications and OS patches if the target device system is operational, network stack is operating and any applications or agents on the target device are operational. In most cases, customers would continue to use these methods when everything is operating fairly well. These methods generally use network resources and run directly through the network interfaces of the target devices and should be able to transfer data faster than a remote media.

There are several exceptions. One exception is if the Basic Input/Output System (BIOS) of the target device needs to be updated. In this case, a physical external connection to the target device is required that does not rely on the operating system or network stack of the target device. Another example is if the OS has failed and network boot is not supported or enabled.

Thus, the remote media capability is required for those instances where the target device is in a state that the normal methods cannot be used. Before the addition of remote media, this would require an administrator to physically access the target device by either entering the data center, or if the device is located where there is no administrator, schedule a dispatch to resolve the problem.

Typical exemplary scenarios of the application of remote media are as follows:

Operating System Install

Virtual Media may be used to install a new operating (OS) system or an OS upgrade on a target server. In these cases, the desired OS will almost certainly be contained on a CD-ROM or stored as an ISO CD image, although those skilled in the art will realize, upon reading this description, that other sources may be used for the OS. Some operating systems may use an additional floppy or the like for supplying install configuration options. This process may be very time consuming, and is likely to be much more so due to the relatively low speed of a Virtual Media connection. Accordingly, safeguards are in place to prevent such operations from being accidentally aborted due to either inadvertent user action or contention amongst multiple users.

Operating System Recovery

Virtual Media may be used to repair damaged operating system installs. This scenario is usually very similar to that of the OS install and has the same basic requirements.

Hard Drive Recovery/Duplication

The ability to recover a system hard drive to a known state or to quickly place identical OS baselines on multiple machines is often necessary in system test and other such environments. Tools such as Ghost exist to perform some of these functions. The present invention provides mechanisms to duplicate a hard drive remotely, via USB ports of a target machine. This may require that the target device support USB in the BIOS rather than the OS.

Bios Update

BIOS upgrades often come on floppy disks but will likely start requiring the use of a USB memory stick as the size of these files continues to grow.

Configuration Backup/Crash Analysis

In some cases it may be useful to store data from a remote machine. Examples of this would be storing a backup copy of some low-level configuration data or retrieving crash dump data for analysis.

Pre-Boot Virus Scan

Using a remote virtual media device to perform pre-boot virus scans of the target's real drives allows the administrator to use a "trusted" boot device to bring up the target without the danger of infecting the virtual drive.

Booting from Virtual Media (Disaster Recovery)

When the target's bootable storage is damaged or unreliable, virtual media devices could be used to bring up the damaged machine for repairs.

Note that not all BIOSs support USB booting and not all BIOSs support USB boot devices equally. Some BIOSs only support USB floppy device booting while others support a wide variety of boot devices including floppy, CD, flash devices, and hard drives.

Convenience

Since users of virtual media will frequently be physically remote from target machines, many of them will find the ability to load files remotely through KVM appliances to be convenient.

As one example, a user may have a CD which contains an application that he wants to load on the target. Using existing network services, he could post an image of the CD to a network site and then load it to the target. This would require several steps. A simpler approach would be to use the remote KVM session to establish a remote media link and install the application directly from the CD in the client system's CD drive.

Figure 7A:
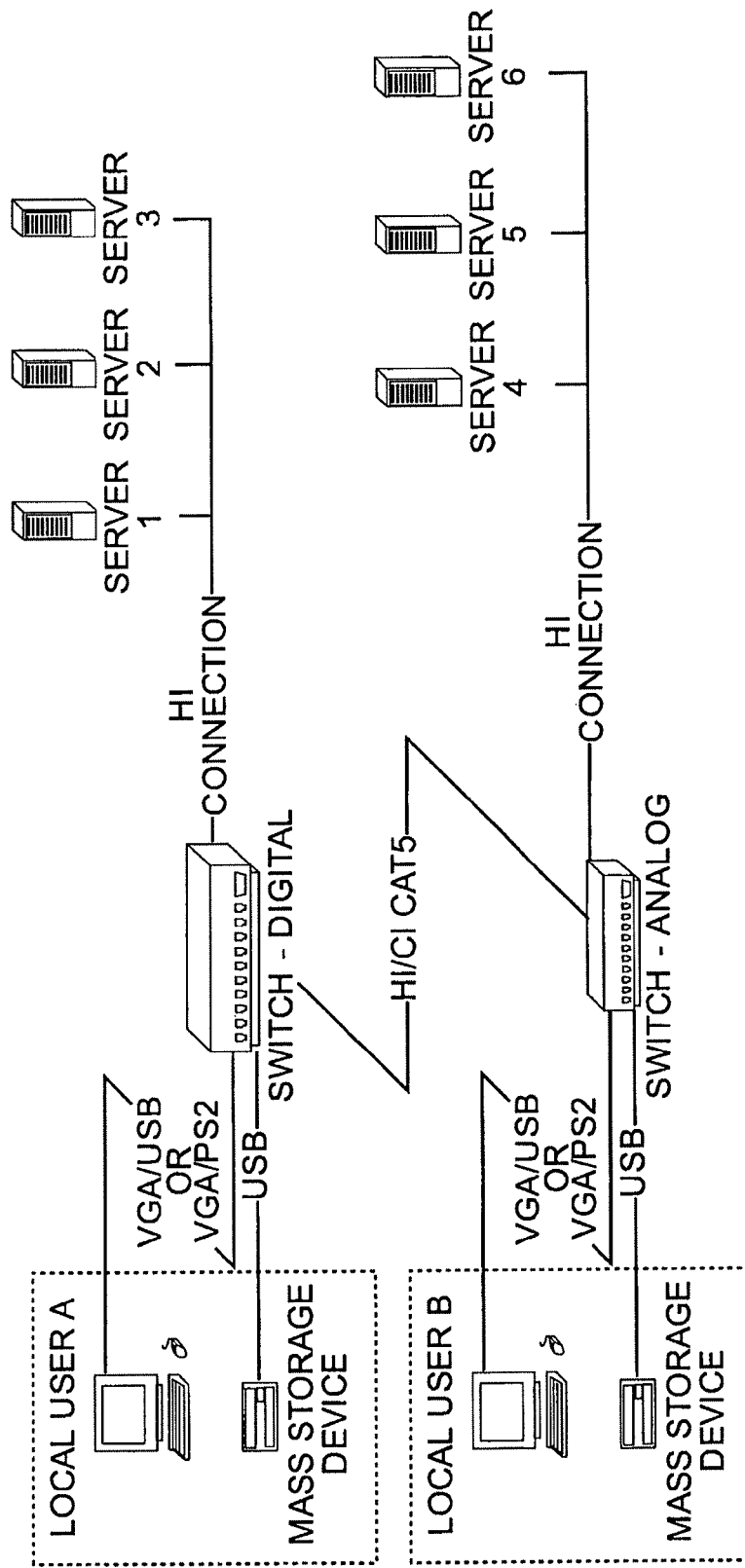
FIGS. 7(a)-7(b) show connection methods.

Connection and Use Cases:

Local Access:

FIG. 7(a) shows one connection method using the local ports of two tiered appliances. In this diagram, Local User A is connected to a digital appliance and Local User B is connected to an analog appliance. The analog appliance is tiered below the digital appliance.

Local User A has access to the servers (1-3) connected directly to the target device ports of the digital switch as well as the servers (4-6) that are connected to the target device ports of the tiered analog appliance. In this case, the connection between the Digital appliance and the Analog appliance is using one of the local ports on the Analog appliance (through the direct connect ACI port). User B is connected to the second port, so no additional connections can be made to the Analog appliance. Since in this case User B is connected to the Analog appliance, User B can only access those devices connected directly to target device ports of the Analog appliance. In the maximum case, in some implementations, the Digital appliance could have 16 tiered appliances connected to it. This would provide User A with the ability to connect to 256 target devices. Note that if additional devices are connected to the tiered appliances via a PEM or chaining IQ (the term "IQ" refers to a RIP device), User A and User B would only be able to establish a KVM console session with those devices.

For some embodiments, User A can only use media directly attached to the Digital appliance to establish a media session with any available target device (Servers 1-6). User B can only use media directly attached to the Analog appliance to establish a media session with any available device (Server 4-6).

Remote Access

Figure 7B:
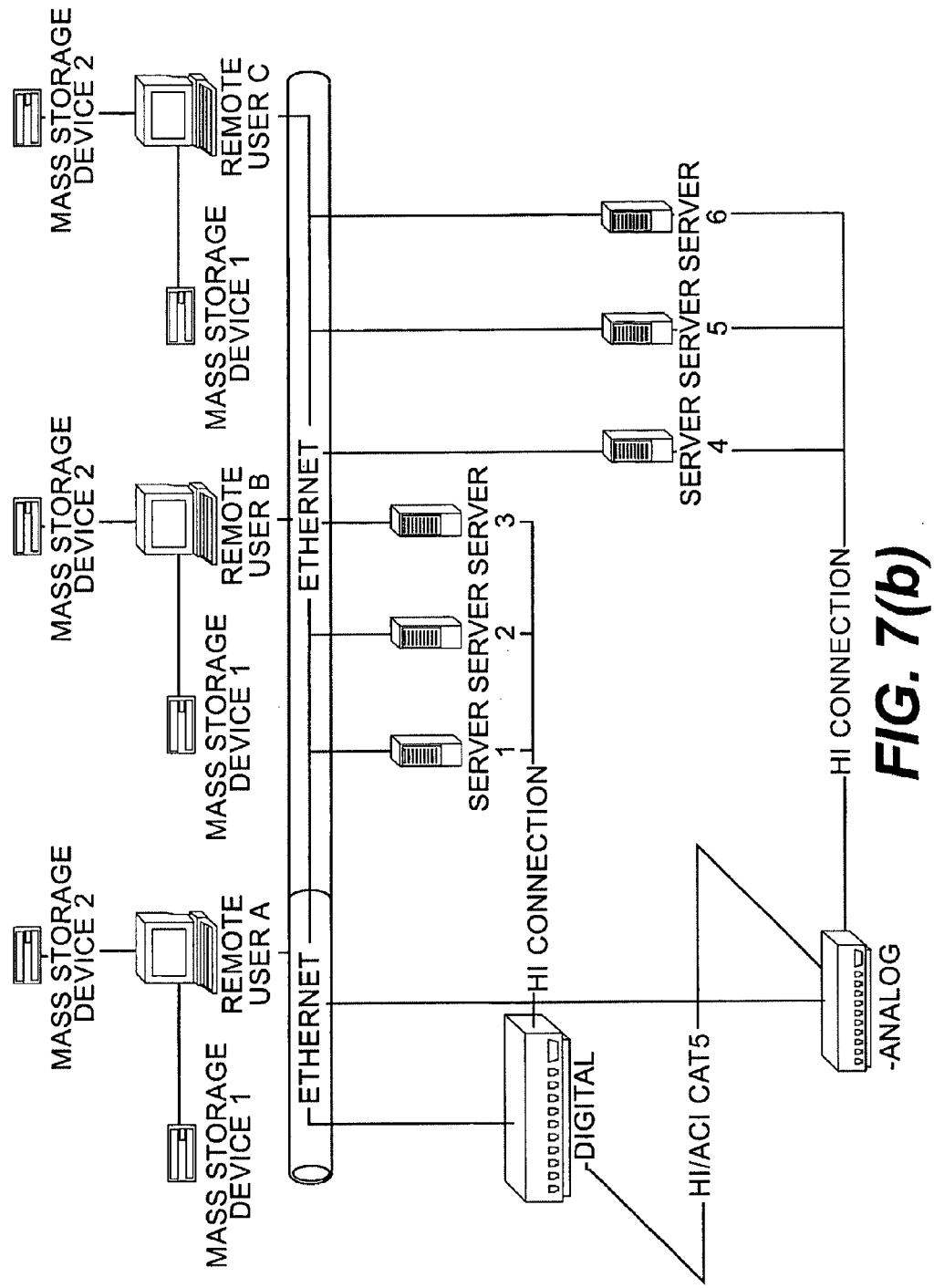

The digital appliance will allow users to remotely connect to target devices. FIG. 7(b) shows the connection method used in a remote connection. In this diagram, Remote Users A, B and C may connect to the Digital appliance through the appropriate client software. The Analog appliance is tiered below the Digital appliance.

The remote users can connect to servers 1-6 via the remote connection. In the case of servers 1-3, since they are directly connected to the digital appliance, all data (both KVM and media) remain within the digital appliance. Assuming sufficient digital ports in the digital appliance, all three users could be connected to the three locally attached servers (servers 1-3).

In order to connect to servers 4-6, the data link between the digital appliance and the analog appliance is used. As stated in the section on Local Connections, the link between the two appliances can carry one KVM session and one media session. For a media connection between User A and Server 4, a connection is made with the Digital Appliance, the KVM and media sessions are switched to the appropriate target device port for connection to the analog appliance. Through the ACI interface, the analog appliance will receive the information required to set up the connection within the analog device to the desired server (in this case Server 4). As previously stated, the media stream will enter the analog appliance via the ACI or local port, not the network port. While Remote User A is using the connection between the two tiered switches, the other users (Remote Users B and C) cannot access the other servers on the tiered switch (Servers 5 and 6 in this case).

For some embodiments, Remote Users can only use media attached to the remote system where the client software is operating (can be physical or mapped drives).

Sharing and Preemption

Figure 8A:
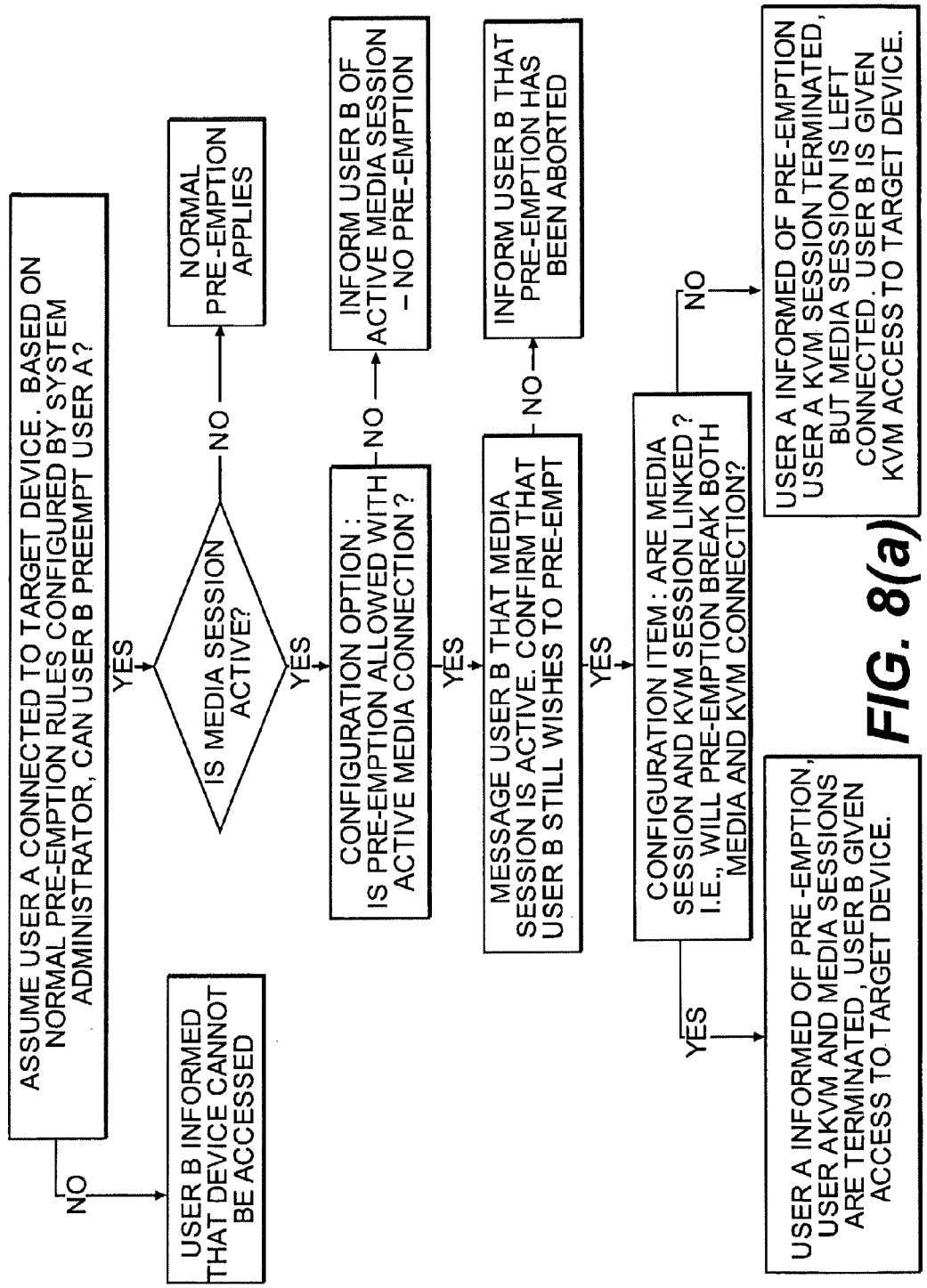
FIGS. 8(a)-8(b) depict sharing and pre-emption handling.
Figure 8B:
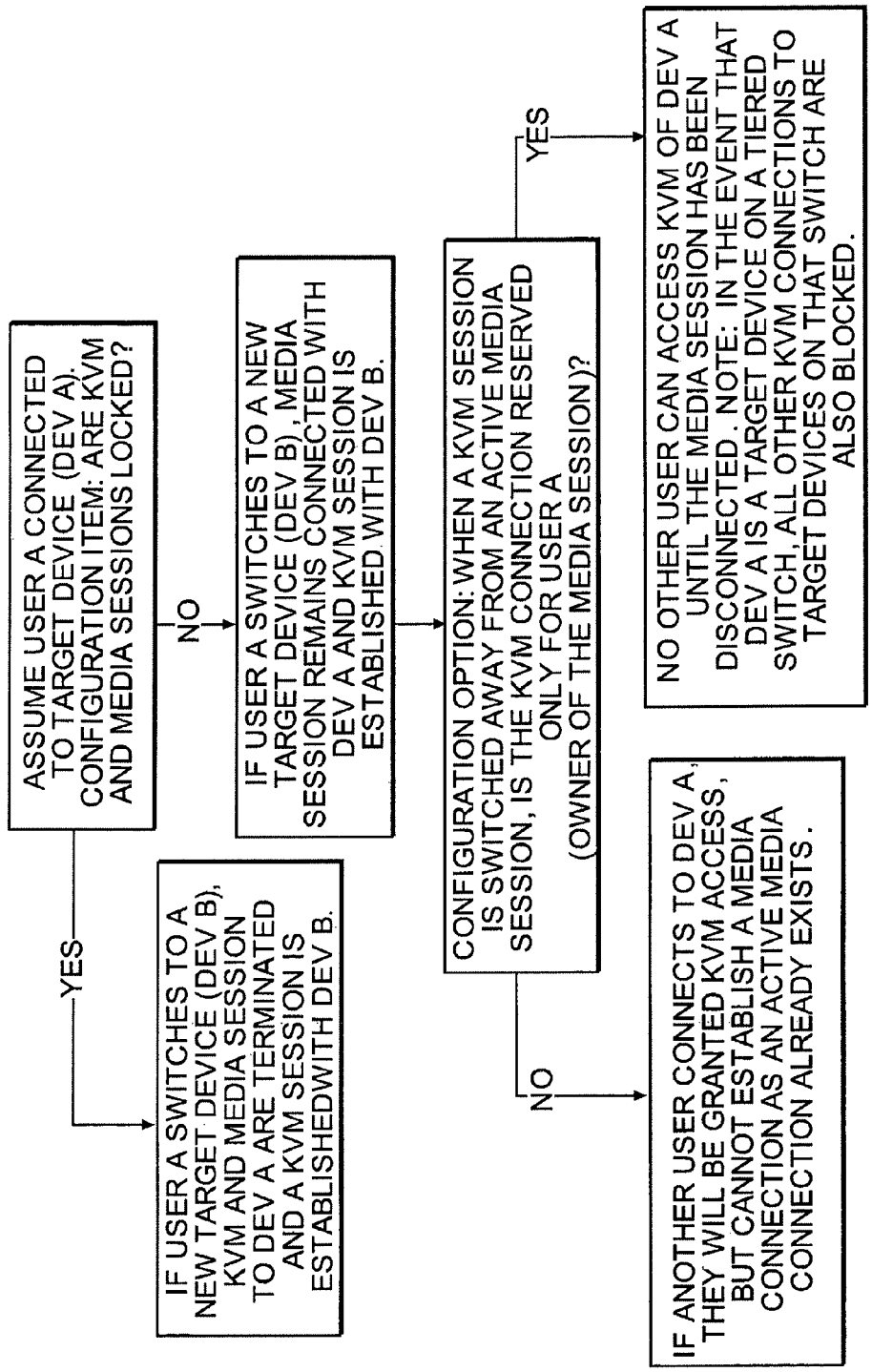

There are many different options for sharing, reserving or preempting session since the KVM and media sessions are two different sessions. Users are provided a variety of ways that they would like for these interactions to work. The options should preferably be configurable so a user can set the system to operate within the constraints they define. For these options, it is assumed that the user has established a KVM session and started a media session. FIG. 8(a) shows preemption cases and FIG. 8(b) shows blocking cases. In FIG. 8(a), assume User A Connected to target device and normal preemption rules configured by system administrator.

The first option should preferably be for the customer to lock the KVM and media sessions together. In this mode, when a KVM session is disconnected, so is the associated media session. If they are not locked together, then it is possible for the KVM session to be switched away leaving the media session active. This could be important if the user is reloading an operating system that is going to take a fairly long period of time and wants to establish a KVM session with a different target device to perform other functions.

Once a target device has an active media session without an active KVM session, there are two situations that can occur—the original user (User A) can reconnect or a different user (User B) can connect to that channel. There should preferably be an option where the system can be set that only the user with the media session (User A in this case) can access that channel with a KVM session (reserve the KVM connection). Once another user (User B) can access that session, they can control media that is connected to the user (User A) that set up the media connection. This could pose a security risk. In a tiered environment, by reserving the KVM with the media connection, only User A could access the lower switch, the KVM channel between the upper switch and lower switch would be reserved for User A.

Dealing with preemption options adding media connections creates many additional combinations. First, users/customers should preferably be able to disable any preemptions. (It is assumed that in preferred implementations of the invention, a system administrator has a method to disconnect any active KVM and/or media session from the DS Software Administrative Console. This capability would not allow the administrator to "take over" the media connection, only terminate it.) Thus, once a user has a connection, the user essentially "owns" that connection until they release it. If preemption is allowed for KVM, there should preferably be an option to disable preemption if a media session is in progress.

In preferred embodiments, preemption should follow the current concepts of level of users. A customer should be able to set up how those preemption rules will work (e.g., any user can preempt, a user may preempt a user at a lower access level, a user may preempt a user at the same or lower access level, etc).

Since the KVM and media session are different sessions, the preemption should have an option such that if preemption is allowed with a media connection, the administrator will be able to select whether a KVM preemption preempts only the KVM or both the KVM and media.

If preemption is allowed with a connected media session, the preempting user should receive a confirmation message that there is an active media session to the particular target device. The preempting user may either cancel the preemption request or continue with the preemption. The user being preempted is notified of the preemption and the user preempting.

There is a preemption mode that will query the current user whether or not to allow a preemption (This has been referred to as cooperative mode). If this mode is turned on, then no preemption can occur unless the current user relinquishes control.

The last area is share mode. Again, an administrator will be able to disable share mode if a media session is active. In the event that multiple users are sharing only the user that established the connection (the primary user) is able to establish a media session. If sharing is enabled with a media session, then any shared users will be able to "see" the attached media device on the target device.

General Remote Media Assumptions

Preferably, remote media connections are not automatically established; and they require some action either by the user or by external software to connect the media source. This is for security reasons and to avoid preemption and sharing issues. Users and privileges should be authenticated prior to establishing connections. In some cases, that may be done via software and in other cases by an external source. For some implementations, a console connection will be KVM and the KVM session should be established prior to establishing a media connection.

Appliance Based Products

In a framework/platform as described, analog and digital switch users will be able to establish virtual media connections between a media source that has either a remote or local connection to any VM switch.

From an appliance viewpoint, Local Virtual Media is the media source directly connected to the local port of a KVM/VM switch (Analog or digital). Remote Virtual Media is the media source is connected through a remote workstation by means of a remote client application and an Ethernet connection.

In some presently preferred embodiments, the remote media source may be connected as a USB device to the target device. The capability will be the same as if the device were physically connected to the target device. That is, if a capability does not exist with a directly attached USB device to the target device, the remote device will not have that capability either—an example is the ability to boot from a USB device. This requires boot support in the BIOS of the target device.

The USB IQ should present a USB connection to the target device whether or not there is an active media session. This connection may be a single composite device with both a CD-ROM and removable media devices enumerated.

In some presently preferred embodiments, the maximum distance between the KVM/VM appliance and the USB IQ will be 150 feet at a resolution of 640×480 @ 65 Hz.

In some presently preferred embodiments, the appliance supports a maximum of three levels of tiering for KVM sessions. (Three levels of tiering include two levels of switches—either two analog or one analog and one digital plus one level of expansion modules (PEM) or chaining IQ's.)

In some embodiments, the virtual media connection supports only two levels of tiering. (Two levels of tiering include two switches connected to each other—either two analog or one analog and one digital. Media cannot span the third tier consisting of PEM or chaining IQ's since those cannot transport the media connection.)

In some embodiments, the tiered virtual media connection may be accomplished by a direct connection of a target device port to the local port of the secondary switch. This connection can use a direct connect ACI port or use a USB IQ with ACI protocol passed over the USB. The network port shall not be used to transfer media streams between two appliances.

For tiered systems, the top-most switch may be able to gather the computer names from the switches below. This can use either a dedicated ACI port or via an IQ connected to the local USB port of the tiered switch.

When a remote user is connected to a digital appliance and using a tiered connection to an analog appliance, the remote data stream should be connected to the digital appliance and passed to the analog tiered appliance using the high speed data path (CI/HI), not the network connection.

The KVM console session and the remote media session should be independent. However, in preferred embodiments, a media session can only be initiated from an active KVM console session.

The maximum number of media sessions should equal the number of available KVM console channels (Total number of Analog plus Digital unique connections that can be made). For example, one device may have three independent KVM or media connections while another may have four.

A connection between two appliances that is used for tiering should have only one KVM console channel and one media channel. These two channels can be switched to different target devices on the tiered appliance.

Preferably, sharing of a KVM session is allowed between the two local users of the analog switch. Sharing is not allowed between a local and remote user on a Digital switch.

There should be no sharing of the media connection between any users. Only one media connection can be established to any target device.

The user should be authenticated prior to any KVM console or media session being established.

For some implementations, devices that are directly connected to the local port of an appliance may be used for a media connection for Local Users. Remote Users can use any device that can be mapped in their Operating System and mounted to the target device by the client software. For some other implementations, both the analog and digital appliances are able to establish connections to media servers in the network that may have libraries of images or application installations instead of using media directly attached to the appliance. This connection would be via the network port present on both the Analog and Digital Appliances.

By separating the requirements of the KVM console and remote media connections, there is a significant amount of flexibility added to the system architecture. There are implications to sharing and reserving channels for users as well. In order to provide customers flexibility and the ability to control the rules of engagement for the media connections, there will be a requirement to provide customers with the ability to configure the connection policies for both the console and media connections.

Embedded Remote Media

Hardware Based Embedded Products
Configurations
Single User

In some implementations, there may only be a single video channel available for both the local and remote ports. This causes a complication where a local user may suddenly disconnect the remote user since that port has higher priority. As a result the client software is preferably separated into components for KVM and Virtual Media. The idea is that a remote user who is performing a critical operation such as an OS install will not be likely to have that operation inadvertently affected. At a later time the remote user can do whatever action is necessary to resolve the access contention without having to restart the operation.

IP/Integrated Products

One scenario involves a single user accessing the target remotely. In this scenario the Virtual Media control component is included directly into the viewer component. As a result there is a one to one mapping of clients to targets and when a viewer session is closed all of its Virtual Media connections will also be closed. If the user wishes to control multiple servers at once they can simply open an additional viewer.

A standard implementation creates one USB endpoint available for a CD-ROM or DVD connection and one for a floppy or memory stick.

Data centers are inherently security risks, and any physical access to a data center is a recipe for trouble. This invention provides administrators with needed access to data centers for various reasons, including loading CDs, patching the OS, and running diagnostics. Virtual Media provide a method to eliminate this as a reason for access to the data center, benefiting a company's bottom line.

The present invention was described in some aspects with reference to a KVM system. One skilled in the art will immediately realize and understand, upon reading this description, that aspects of the present invention are not limited to operating in such a system.

The present invention was described in some aspects with reference to the USB 2.0 standard. One skilled in the art would immediately realize and understand, upon reading this description, that the invention will work with other USB standards and is not limited to the USB 2.0 standard. This invention is not limited to any particular serial standard (such as USB), but may be used with any serial protocol currently contemplated or contemplated in the future.

While the protocols used and described herein have been specified in detail regarding the order of their bits and the locations of their various fields, those skilled in the art will realize, upon reading this description, that other bit orderings and field positions may be used. Furthermore, those skilled in the art will realize and understand, upon reading this description, that other and/or different protocols may be used to accomplish the same results, and these other protocols, now contemplated or contemplated in the future, are within the scope of the present invention.

Thus are described a virtual media systems/frameworks, methods and devices, usable in a KVM environment Virtual Media may be considered as simulated media that performs the same function of a mass storage device without physically being directly connected. Virtual Media allows administrators to increase operational efficiency in remote server management by mapping local removable media or mass storage device to a remote server. This provides the administrator the ability to perform file transfers, application and OS patches, and diagnostic testing from a CD. The described system allows transporting virtual media through generic KVM devices, without the need for special drivers, agent or hardware at the target servers.

While the invention has been described with reference to storage devices, those skilled in the art will realize and understand, upon reading this description, that other devices connected to a client, such as, e.g., cameras, audio devices and biometric devices and the like, may be mapped as virtual devices on a target computer. These other devices are within the scope of the invention.

Aspects of the present invention, such as, e.g., the GUI, may be implemented as part of the processor or as a program residing in memory (and external storage) and running on processor, or as a combination of program and specialized hardware. When in memory and/or external storage, the program can be in a RAM, a ROM, an internal or external disk, a CD ROM, an ASIC or the like. In general, when implemented as a program or in part as a program, the program can be encoded on any computer-readable medium or combination of computer-readable media, including but not limited to a RAM, a ROM, a disk, an ASIC, a PROM and the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method, for use in a client computer system including a pointing device and a visual display unit, for providing a graphical user interface (GUI) to a computer program for supporting a virtual media system, the method comprising:
    displaying on a screen of the visual display of the client computer a dialog listing media devices connected to the client computer;
    in response to said displaying, obtaining a selection by a user of at least one media device on the client computer listed in the dialog listing; and in response to said obtaining, attempting to cause the selected media device to be mapped as a device on a target computer distinct from the user computer, wherein the client computer is connected to the target computer, at least in part, via a USB port of the target computer.

2. The method of claim 1, further comprising performing a login operation.

3. The method of claim 1, further comprising displaying a progress dialog.

4. The method of claim 1, wherein the listed media devices include physical drives on the client computer, and the method further comprises displaying the physical drives.

5. The method of claim 4, further comprising monitoring which physical drives are present on the client computer.

6. The method of claim 1, further comprising the limiting the selected media device to be mapped to read-only.

7. A method, for use in a client computer system including a pointing device and a visual display unit, for providing a graphical user interface (GUI) to a computer program for supporting a virtual media system, the method comprising:

displaying, on a screen of the visual display of the client computer, a dialog listing media devices connected to the client computer and mapped as devices on a target computer distinct from the user computer;

in response to said displaying, obtaining a selection by a user of at least one media device on the client computer listed in the dialog listing; and in response to said obtaining, attempting to cause the selected media device to be unmapped as a device on the target computer, wherein the client computer is connected to the target computer, at least in part, via a USB port of the target computer.

8. The method of claim 7, further comprising performing a login operation.

9. The method of claim 7, further comprising displaying a progress dialog.

10. The method of claim 7, wherein the listed media devices include physical drives on the client computer, and the method further comprises displaying the physical drives.

11. The method of claim 10, further comprising monitoring which physical drives are present on the client computer.

\* \* \* \* \*